United States Patent
Sudou

(10) Patent No.: US 9,372,556 B2
(45) Date of Patent: Jun. 21, 2016

(54) ELECTRONIC DEVICE, INFORMING CONTROL METHOD, AND STORAGE MEDIUM STORING CONTROL PROGRAM

(75) Inventor: Tomohiro Sudou, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 391 days.

(21) Appl. No.: 13/534,333

(22) Filed: Jun. 27, 2012

(65) Prior Publication Data

US 2013/0002580 A1 Jan. 3, 2013

(30) Foreign Application Priority Data

Jun. 28, 2011 (JP) ................. 2011-143503
Jun. 27, 2012 (JP) ................. 2012-144030

(51) Int. Cl.
*G06F 3/038* (2013.01)
(52) U.S. Cl.
CPC ..................... *G06F 3/038* (2013.01)
(58) Field of Classification Search
CPC ...................................... G06F 3/041
USPC ......................................... 345/173; 715/863
See application file for complete search history.

(56) References Cited

U.S. PATENT DOCUMENTS

| | | | |
|---|---|---|---|
| 6,745,193 B1 * | 6/2004 | Horvitz et al. | 707/796 |
| 8,428,560 B2 | 4/2013 | Matsumoto et al. | |
| 8,539,376 B2 | 9/2013 | Utsuki et al. | |
| 2003/0004961 A1 * | 1/2003 | Slothouber et al. | 707/100 |
| 2005/0055648 A1 * | 3/2005 | Dong | 715/963 |
| 2010/0173677 A1 * | 7/2010 | Fu | 455/566 |
| 2010/0184484 A1 * | 7/2010 | Lindberg et al. | 455/566 |
| 2012/0102437 A1 * | 4/2012 | Worley et al. | 715/863 |
| 2012/0198002 A1 * | 8/2012 | Goulart et al. | 709/206 |
| 2012/0235930 A1 * | 9/2012 | Lazaridis et al. | 345/173 |

FOREIGN PATENT DOCUMENTS

| | | |
|---|---|---|
| JP | 2004-343475 A | 12/2004 |
| JP | 2005-328167 A | 11/2005 |
| JP | 2009-159547 A | 7/2009 |
| JP | 2009-171153 A | 7/2009 |
| JP | 2009-278295 A | 11/2009 |
| JP | 2010-154099 A | 7/2010 |

(Continued)

OTHER PUBLICATIONS

Office Action mailed Feb. 10, 2015, corresponding to Japanese patent application No. 2012-144030, for which an explanation of relevance is attached.

(Continued)

*Primary Examiner* — Amare Mengistu
*Assistant Examiner* — Shawna Stepp Jones
(74) *Attorney, Agent, or Firm* — Hauptman Ham, LLP

(57) ABSTRACT

According to an aspect, an electronic device includes an informing unit, an operating unit, and a control unit. The informing unit performs informing of first information and informing of second information to be informed after the first information. The operating unit accepts an operation. The control unit causes the informing unit to suppress the informing of the second information when the operation is performed for the operating unit during a period of time from when the informing of the first information is performed until the second information is informed, or during the informing of the second information.

21 Claims, 19 Drawing Sheets

(56) References Cited

FOREIGN PATENT DOCUMENTS

| | | |
|---|---|---|
| JP | 2011-53790 A | 3/2011 |
| JP | 2011070498 | 4/2011 |
| WO | 2008/146747 A1 | 12/2008 |

OTHER PUBLICATIONS

Office Action mailed Aug. 18, 2015, corresponding to Japanese patent application No. 2012-144030, for which an explanation of relevance is attached.

* cited by examiner

ELECTRONIC DEVICE, INFORMING CONTROL METHOD, AND STORAGE MEDIUM STORING CONTROL PROGRAM

CROSS-REFERENCE TO RELATED APPLICATIONS

This application claims priority from Japanese Application No. 2011-143503, filed on Jun. 28, 2011, and Japanese Application No. 2012-144030, filed on Jun. 27, 2012, the contents of which are incorporated by reference herein in their entirety.

BACKGROUND

1. Technical Field

The present disclosure relates to an electronic device, an informing control method, and a storage medium storing therein a control program.

2. Description of the Related Art

In recent years, electronic devices such as mobile phones have become multifunctional. The electronic devices are configured to support users so that the users can favorably perform activities using the electronic devices. For example, a mobile phone disclosed in Japanese Patent Application Laid-Open No. 2011-70498 performs control to display email information indicating a summary of an email, in a specific area of a display unit when receiving the email. As a result, a user can know a summary of the received email without opening an email browsing screen.

When, as in the above-described art, informing is performed to support the user, depending on how informing is performed, user activity may be rather interfered. For example, if arrival of an email or the like is informed using the entire display unit in the middle of the user performing activity using an electronic device, then the activity being performed by the user is forcefully interrupted.

For the foregoing reasons, there is a need for an electronic device, an informing control method, and a storage medium storing therein a control program for informing information to a user while inhibiting anything that interferes with user activity.

SUMMARY

According to an aspect, an electronic device includes an informing unit, an operating unit, and a control unit. The informing unit performs informing of first information and informing of second information to be informed after the first information. The operating unit accepts an operation. The control unit causes the informing unit to suppress the informing of the second information when the operation is performed for the operating unit during a period of time from when the informing of the first information is performed until the second information is informed, or during the informing of the second information.

According to another aspect, an informing control method is performed by an electronic device. The informing control method includes: informing first information; informing second information after informing the first information; and suppressing the informing of the second information when an operation is detected during a period of time from when the first information is informed until the second information is informed, or during the informing of the second information.

According to another aspect, a non-transitory storage medium stores therein a control program. When executed by an electronic device, the control program causes the electronic device to execute: informing first information; informing second information after informing the first information; and suppressing the informing of the second information when an operation is detected during a period of time from when the first information is informed until the second information is informed, or during the informing of the second information.

DETAILED DESCRIPTION

Exemplary embodiments of the present invention will be explained in detail below with reference to the accompanying drawings. It should be noted that the present invention is not limited by the following explanation. In addition, this disclosure encompasses not only the components specifically described in the explanation below, but also those which would be apparent to persons ordinarily skilled in the art, upon reading this disclosure, as being interchangeable with or equivalent to the specifically described components.

In the following description, a mobile phone is used to explain as an example of the electronic device; however, the present invention is not limited to mobile phones. Therefore, the present invention can be applied to various type of devices, including but not limited to personal handyphone systems (PHS), personal digital assistants (PDA), portable navigation units, personal computers (including but not limited to tablet computers, netbooks etc.), media players, portable electronic reading devices, and gaming devices.

Figure 1:
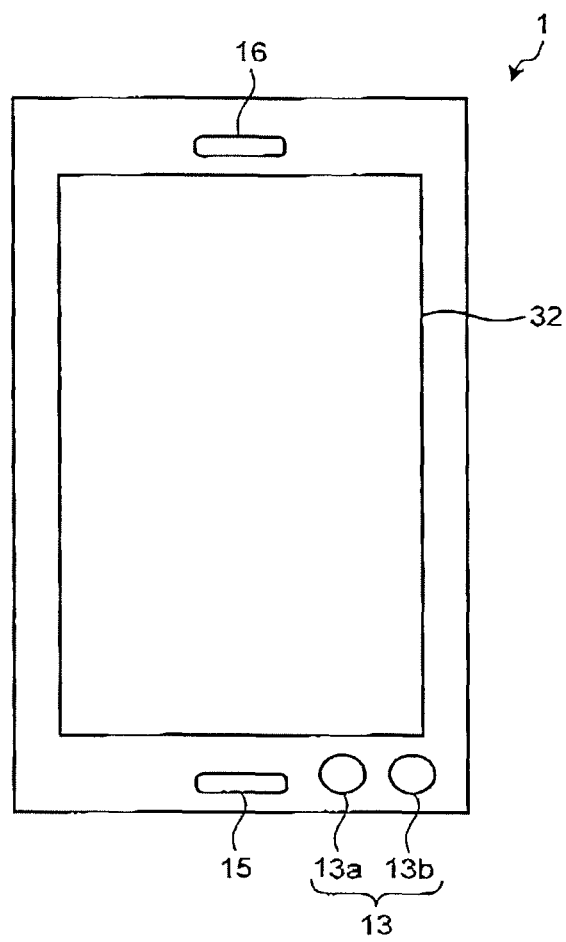
FIG. 1 is a front view of a mobile phone according to a first embodiment.
Figure 2:
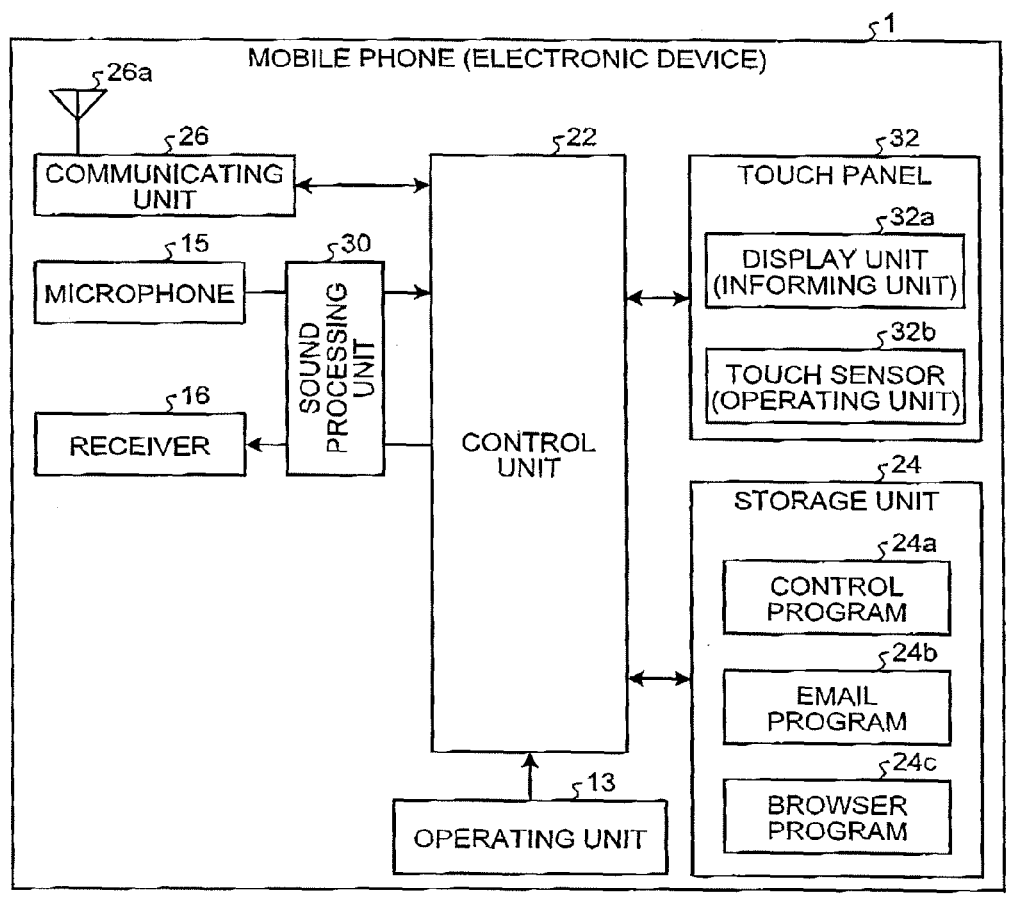
FIG. 2 is a block diagram of the mobile phone according to the first embodiment.

First of all, referring to FIGS. 1 and 2, a configuration of a mobile phone (electronic device) 1 according to a first embodiment will be described. FIG. 1 is a front view of the mobile phone 1. FIG. 2 is a block diagram of the mobile phone 1.

As illustrated in FIGS. 1 and 2, the mobile phone 1 includes an operating unit 13, a microphone 15, a receiver 16, a control unit 22, a storage unit 24, a communicating unit 26, a sound processing unit 30, and a touch panel 32. In the mobile phone 1, a part of each of the operating unit 13, the microphone 15, the receiver 16, and the touch panel 32 is exposed to the front.

The operating unit 13 includes a button 13a and a button 13b, and outputs a signal corresponding to a pressed button to the control unit 22. A signal that operating unit 13 outputs to the control unit 22 is used by the control unit 22 to determine a type of the operation performed by the user for the mobile phone 1. Namely, the operating unit 13 functions as an operating unit that accepts user operation. Examples of the operation determined (detected) by the control unit 22 based on the signal input from the operating unit 13 include short press (single click), long press, double click, etc. Although in the example illustrated in FIG. 1 the operating unit 13 includes two buttons, the number of buttons included in the operating unit 13 may be any.

The microphone 15 obtains sound from the outside. The receiver 16 outputs sound to the outside. The sound processing unit 30 converts the sound inputted from the microphone 15 into a digital signal and outputs the digital signal to the control unit 22. Also, the sound processing unit 30 decodes a digital signal inputted from the control unit 22 and outputs the decoded digital signal, to the receiver 16.

The communicating unit 26 has an antenna 26a, and establishes a wireless signal path using a code-division multiple access (CDMA) system, frequency division multiple access (FDMA) system, or any other wireless communication protocols, with a base station via a channel allocated by the base station, and performs telephone communication and information communication with other devices through the wireless signal path established between the base station and the mobile phone 1. Any other wired or wireless communication or network interfaces, e.g., LAN, Bluetooth, Wi-Fi, NFC (Near Field Communication) may also be included in lieu of or in addition to the communication unit 6.

The touch panel 32 has a first function of displaying various types of information such as text, graphics, and images. The touch panel 32 has a second function of detecting a contact with a certain area such as a displayed icon or button or text input area. The touch panel 32 includes a display unit 32a and a touch sensor 32b which are superimposed on each other. The display unit 32a and the touch sensor 32b can share some of their constituent materials with each other.

The display unit 32a includes a display device such as a liquid crystal display (LED), an organic electro-luminescence display (OELD), or an inorganic electro-luminescence display (IELD). The display unit 32a displays various types of information, according to a control signal inputted from the control unit 22. The display unit 32a is also used as an informing unit for informing a user about information.

The touch sensor 32b detects a contact with a surface of the touch panel 32 using his/her finger(s), a pen, a stylus or the like (in the description herein below, for the sake of simplicity, it is assumed that the user touches the touch panel 32 with his/her finger(s)). The touch sensor 32b outputs a signal (e.g., a signal indicating at least one of a position and a pressure of the contact) according to the detected contact, to the control unit 22. A signal that touch sensor 32b outputs to the control unit 22 is used by the control unit 22 to determine a type and a position of the operation (gesture) performed by the user for the mobile phone 1. Namely, the touch sensor 32b functions as an operating unit that accepts user operation. A method for detecting the contact by the touch sensor 32b may be any, e.g., a capacitive type method, a resistive type method, a surface acoustic wave type method (or an ultrasonic type method), an infrared ray type method, an electromagnetic induction type method, or a load sensing type method. Examples of the operation (gesture) determined (detected) by the control unit 22 based on the signal input from the touch sensor 32b include tap operation, double-tap operation, long tap operation, sweep (swipe) operation, flick operation, etc.

The tap operation is operation where a finger is brought in contact with the touch panel 32 and is removed from the touch panel 32 immediately thereafter. The double-tap operation is operation where the operation of bringing a finger in contact with the touch panel 32 and removing the finger from the touch panel 32 immediately thereafter is repeated twice. The long tap operation is operation where a finger is brought in contact with the touch panel 32 and is removed from the touch panel 32 after maintaining a state in which the finger is in contact with the touch panel 32 for a certain period of time. The sweep operation is operation where a finger is allowed to move, with the finger remaining in contact with the touch panel 32. The sweep operation is, in some cases, called drag operation when some kind of object displayed on the touch panel 32 moves with the operation. The flick operation is operation where after a finger is brought in contact with the touch panel 32, the finger is removed while the finger is allowed to move rapidly in one direction such that the finger is flicked quickly.

The control unit 22 includes a CPU (Central Processing Unit) which is a processing unit; and a memory which is a storage unit. The control unit 22 implements various functions by executing programs using these hardware resources. Specifically, the control unit 22 reads a program and data stored in the storage unit 24 and loads the program and data to the memory so as to allow the CPU to execute instructions included in the program loaded in the memory. Then, the control unit 22 performs reading or writing of data from/to the memory and the storage unit 24 or controls the operation of the communicating unit 26, the display unit 32a, etc., according to the results of executing the instructions by the CPU. When the CPU executes the instructions, the data loaded to the memory and a signal inputted from the touch sensor 32b, etc., can be used as part of parameter determination conditions. For example, the control unit 22 determines a type of an operation and a button operated thereby based on the signal input from the operating unit 13, and performs a process in accordance with the determination. For example, the control unit 22 determines a type of an operation (a gesture) performed for the touch sensor 32b based on the signal input from the touch sensor 32b, and performs a process in accordance with the determination.

The storage unit 24 includes one or more non-transitory storage medium, for example, a nonvolatile memory (such as ROM, EPROM, flash card etc.) and/or a storage device (such as magnetic storage device, optical storage device, solid-state storage device etc.), and stores therein various types of programs and data. Together with the non-transitory storage medium, a volatile storage device such as DRAM can be adopted. The programs stored in the storage unit 24 include a control program 24a, an email program 24b, and a browser program 24c. The storage unit 24 may be configured by a combination of a portable storage medium such as a memory card and a reading and writing device that performs reading and writing from/to the storage medium. In this case, the control program 24a, the email program 24b, and the browser program 24c are stored in the storage medium. The control program 24a, the email program 24b, and the browser program 24c may be obtained from other devices such as a server, by communication performed by the communicating unit 26, or only some of the programs may be obtained from other devices.

The control program 24a provides a function relating to various types of control for allowing the mobile phone 1 to operate. The function provided by the control program 24a includes the function of controlling informing of a user about various types of information. The email program 24b provides an email function. The browser program 24c provides a Web browser function.

Figure 3:
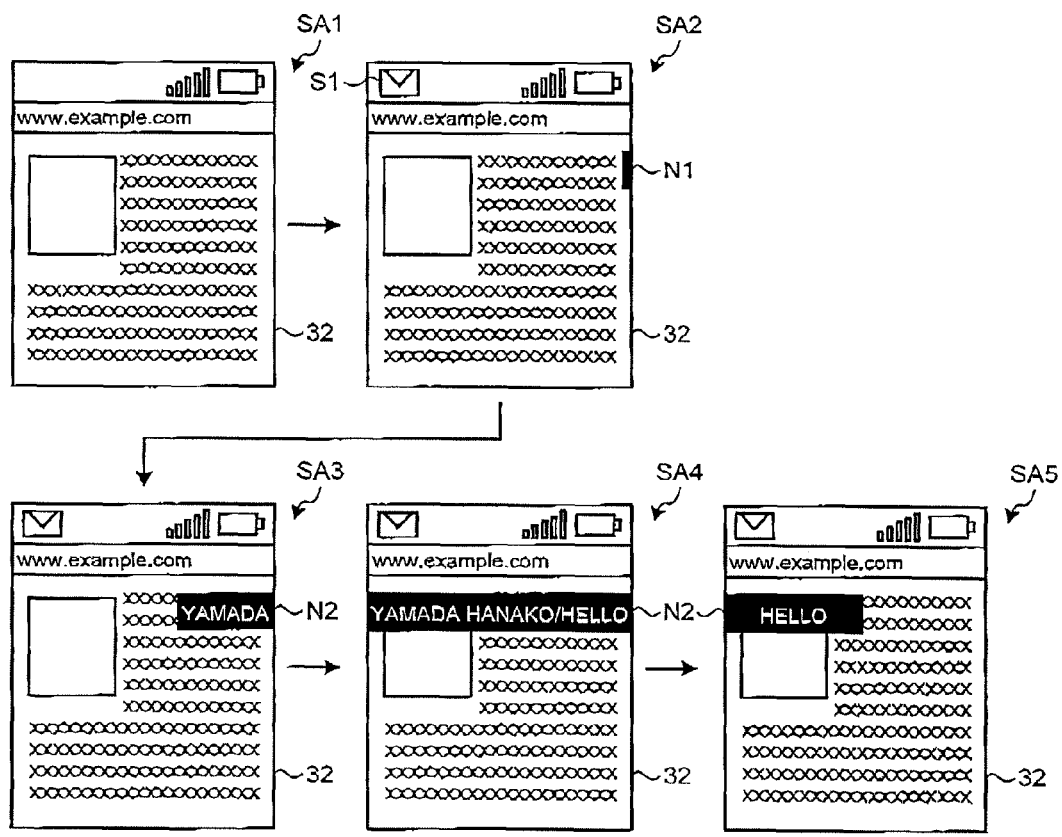
FIG. 3 is a diagram illustrating an example of informing performed when an email arrives.

Then, referring to FIGS. 3 to 11, an example of informing of various types of information which is performed based on the informing function provided by the control program 24a will be described. FIG. 3 is a diagram illustrating an example of informing performed when an email arrives. At Step SA1 illustrated in FIG. 3, a browser screen based on the function provided by the browser program 24c is displayed on the touch panel 32. Namely, at a scene at Step SA1, the mobile phone 1 is used by the user for browsing Web pages.

Here, if an email arrives on the mobile phone 1, then as illustrated at Step SA2, the mobile phone 1 displays an incoming symbol S1 in a notification area provided at the top of the touch panel 32. The mobile phone 1 further displays an informing symbol (first information) N1 at a part of the touch panel 32, e.g., at the right edge of the touch panel 32. The informing symbol N1 is displayed to inform the user in advance that detailed informing will be performed from now on.

Subsequently, as illustrated at Steps SA3 to SA5, the mobile phone 1 scrolls informing information (second information) N2 including the sender and title of the arrived email, from right to left, for example. The informing information N2 may be scrolled only once or may be repeatedly scrolled a predetermined number of times or may be repeatedly scrolled until predetermined operation performed by the user is detected.

In the present embodiment, since text that is read from left to right is adopted as the informing information N2, the scrolling direction is from right to left. In the present embodiment, assuming the case in which the amount of information to be displayed as the informing information N2 is large, a scheme in which the informing information N2 is scrolled is adopted. When the amount of the informing information N2 is small, a scheme in which the informing information N2 stays displayed on the display screen without being scrolled may be adopted. In the present embodiment, an informing area for the informing information N2 is scrolled simultaneously with the informing information N2. The informing area may be scrolled prior to the scrolling of the informing information N2. For a method of displaying the informing area, in addition to scrolling, various methods including fade-in and wipe-in can be adopted.

By thus performing pre-informing by an informing symbol N1 and then displaying informing information N2, the user can know in advance that the informing information N2 will be displayed, and thus, is less likely to overlook the informing information N2. By scrolling the informing information N2, the mobile phone 1 can provide the user with content to be informed in more detail than simply displaying an incoming symbol S1, with interference with browsing Web pages by the user minimized.

The mobile phone 1 can display an informing symbol N1 at an edge of the touch panel 32 so as not to block information being referred to by the user. In order to allow the user to recognize pre-informing, the mobile phone 1 can display the informing symbol N1 in a recognizable mode over a predetermined time (e.g., on the order of 5 seconds). To make the informing symbol N1 recognizable, the mobile phone 1 may display the informing symbol N1 at high luminance or saturation or may allow the informing symbol N1 to blink. For pre-informing, the mobile phone 1 may brighten up the entire area where informing information N2 is scrolled or may change the color of the entire area or may allow the entire area to blink.

Figure 4:
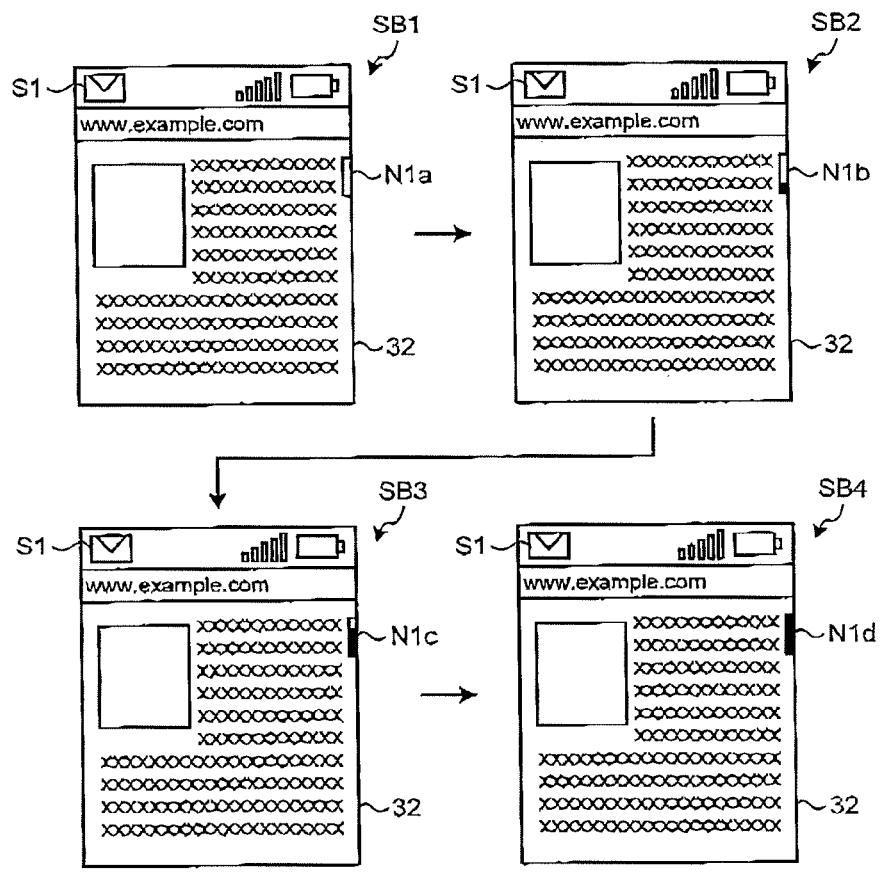
FIG. 4 is a diagram illustrating another example of pre-informing.
Figure 5:
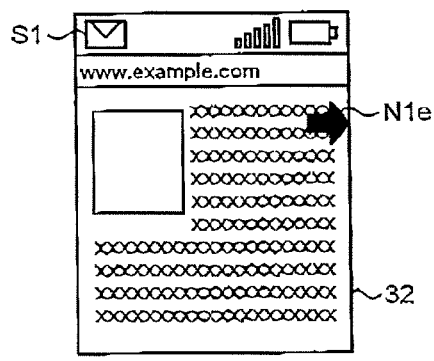
FIG. 5 is a diagram illustrating still another example of pre-informing.
Figure 6:
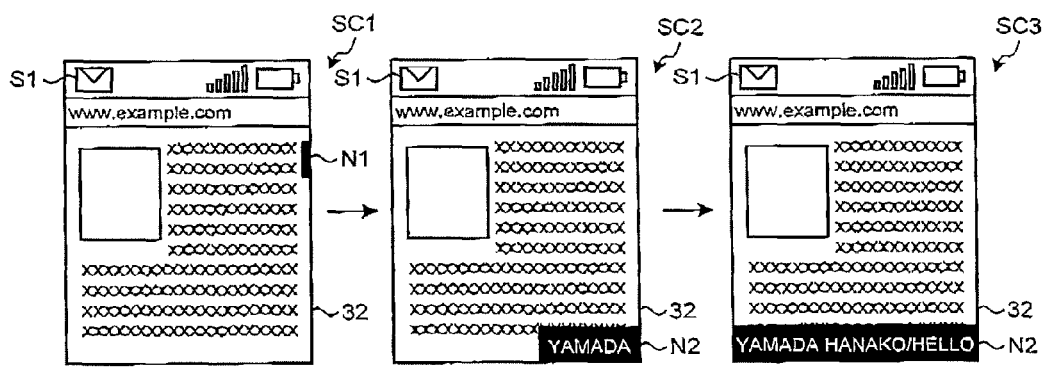
FIG. 6 is a diagram illustrating another example of scrolled display.
Figure 7:
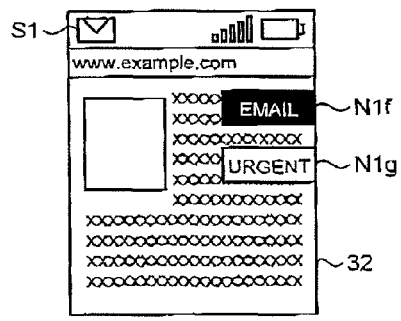
FIG. 7 is a diagram illustrating another example of pre-informing.

The mobile phone 1 may change display of an informing symbol with the passage of time and start scrolling informing information N2 after the change is completed, like informing symbols N1a, N1b, N1c, and N1d at Steps SB1 to SB4 in FIG. 4. By thus controlling the change in informing symbol N1, the user can easily predict from the appearance of the informing symbol N1 when scrolling of informing information N2 starts.

The mobile phone 1 can allow a location where an informing symbol N1 is displayed to coincide with a location where scrolling of informing information N2 starts. By allowing the display location of the informing symbol N1 to coincide with the location where scrolling of the informing information N2 starts, the user can confirm the informing symbol N1 with his/her eyes and then can see the informing information N2 from the start of scrolling thereof, without moving his/her line of sight. To clearly specify a scrolling start location, an informing symbol may be displayed as an arrow like an informing symbol N1e illustrated in FIG. 5. As illustrated at Steps SC1 to SC3 in FIG. 6, a display location of an informing symbol N1 may be made different from a location where scrolling of informing information N2 starts. This scrolling start location may be moved to any location by moving the informing symbol N1 by drag operation. By thus moving the scrolling start location to any location, the mobile phone 1 can provide the user with content to be informed, with interference with browsing Web pages by the user minimized.

The mobile phone 1 can change at least one of the display location and display mode of an informing symbol N1 and informing information N2, according to the type or degree of urgency of notification. For example, in an example illustrated in FIG. 7, the mobile phone 1 displays an informing symbol N1f indicating arrival of a normal email with a black background and displays an informing symbol N1g indicating arrival of an email with a high degree of urgency at a location lower than that of the informing symbol N1f and with a white background. By thus changing at least one of the display location and display mode of an informing symbol N1 and informing information N2, according to the type or degree of urgency of notification, the user can know a summary of the informing information N2 without reading the content of the informing information N2. At least one of the display location and display mode of the informing symbol N1 and the informing information N2 may be changed according to email storage folders based on email senders or email sorting rules.

Figure 8:
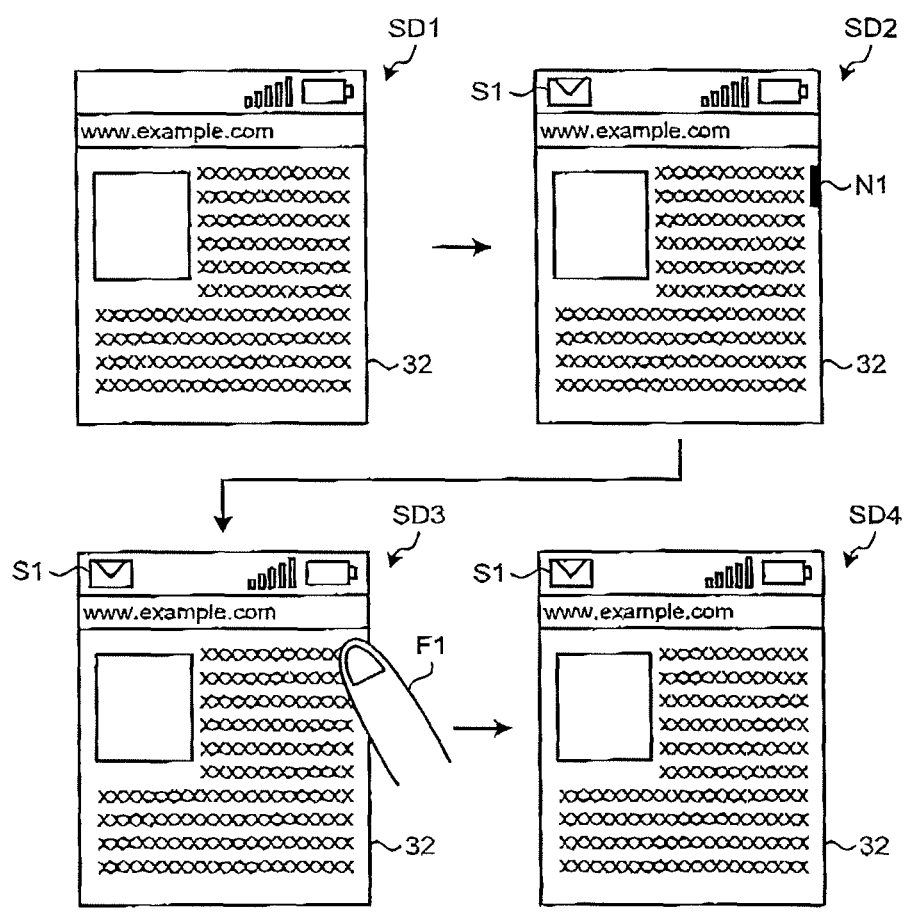
FIG. 8 is a diagram illustrating an example of operation to cancel or postpone informing.

The mobile phone 1 can also suppress display of informing information N2. In the mobile phone 1 of the present embodiment, as a method of suppressing display of informing information N2, the display of the informing information N2 is canceled or postponed. Other methods of suppressing the display of informing information N2 include, for example, a method of transparently displaying the informing information N2 and a method of displaying the informing information N2 in a scale-down manner. FIG. 8 is a diagram illustrating an example of operation to cancel or postpone display of informing information N2. At Step SD1 illustrated in FIG. 8, a browser screen is displayed on the touch panel 32. Here, if an email arrives on the mobile phone 1, then as illustrated at Step SD2, the mobile phone 1 displays an informing symbol N1 at an edge of the touch panel 32.

When the user notices the informing symbol N1 but does not want the informing information N2 to be displayed, as illustrated at Step SD3, he/she taps the display location of the informing symbol N1 with his/her finger F1. When the tap operation performed at the display location of the informing symbol N1 is detected, the mobile phone 1 cancels or postpones display of informing information N2. As a result, as illustrated at Step SD4, after the informing symbol N1 disappears, the informing information N2 is not displayed.

By thus canceling or postponing display of informing information N2, the informing information N2 can be suppressed from becoming interference in the middle of the user concentrating on browsing information, etc. When display of the informing information N2 is postponed, for example, after a lapse of time set in advance by the user, an informing symbol N1 is displayed again. When displaying the informing symbol N1 after the postponement, the display mode or display location of the informing symbol N1 can also be changed from that for the first time so that the user can recognize that postponement is performed once.

The mobile phone 1 may cancel or postpone display of informing information N2 when any other operation than a tap, such as a double tap, a long tap, or a flick, is detected at the display location of an informing symbol N1. By thus using a more complex operation than a simple tap as a requirement, display of informing information N2 can be suppressed from being canceled or postponed due to erroneous operation. The mobile phone 1 may cancel or postpone display of informing information N2 when a tap or the like is detected at a location other than the display location of an informing symbol N1 during display of the informing symbol N1.

Whether to cancel or postpone display of informing information N2 may be determined based on the setting performed in advance by the user. Alternatively, operation may be changed according to the type of detected operation, such as postponing display of the informing information N2 when a tap is detected at the display location of the informing symbol N1 and canceling the display when a double tap is detected. Alternatively, operation may be changed according to the number of times operation is performed, such as postponing display of the informing information N2 when a tap, is detected at the display location of the informing symbol N1 for the first time and canceling the display when a tap is detected at the display location of the informing symbol N1 after the postponement.

The mobile phone 1 may immediately start scrolling informing information N2 when predetermined operation is detected during display of an informing symbol N1. By thus immediately starting scrolling informing information N2 based on user operation, the user can reduce the waiting time before scrolling starts. For example, by immediately starting scrolling informing information N2 when a flick or sweep is detected in a scrolling direction of the informing information N2, intuitive operability can be achieved.

The mobile phone 1 may perform a process associated with informing information N2 when predetermined operation is detected during display of an informing symbol N1. For example, if the informing information N2 is information for informing of arrival of an email, then the mobile phone 1 may display a browsing screen for the arrived email on the touch panel 32 when predetermined operation is detected during display of the informing symbol N1. By thus displaying information associated with the informing information N2 based on user operation, the object of informing is attained at an early stage.

Figure 9:
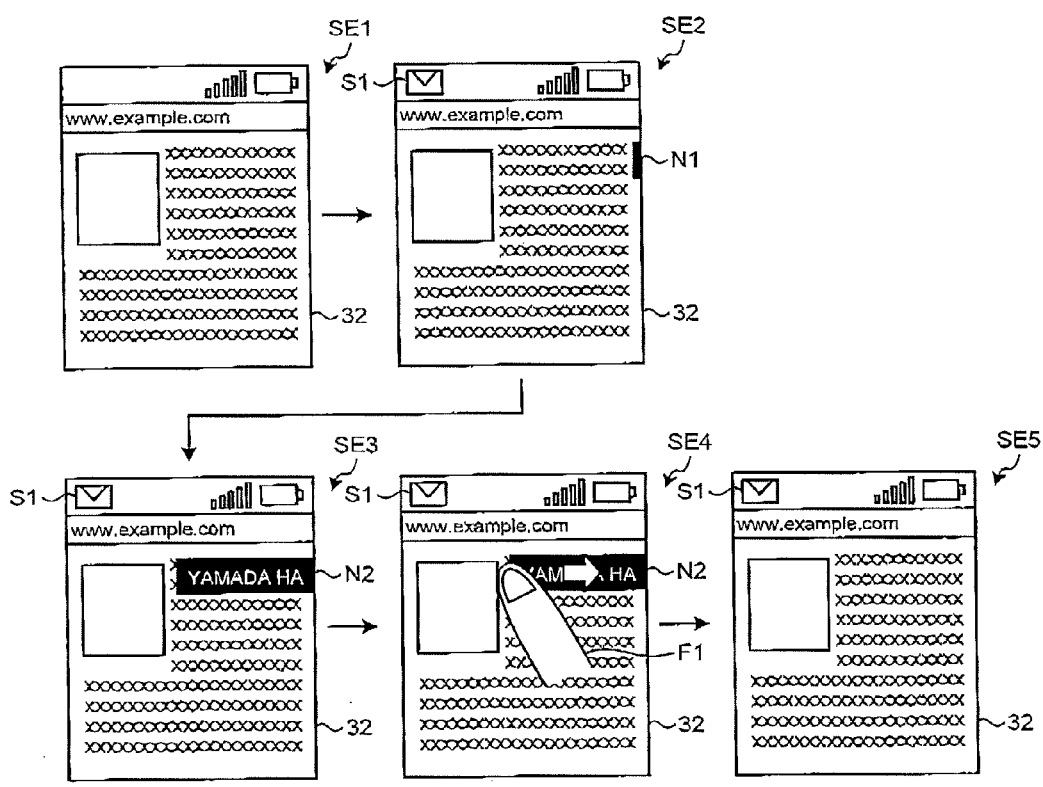
FIG. 9 is a diagram illustrating an example of operation to cancel or postpone informing after display scrolling starts.
Figure 10:
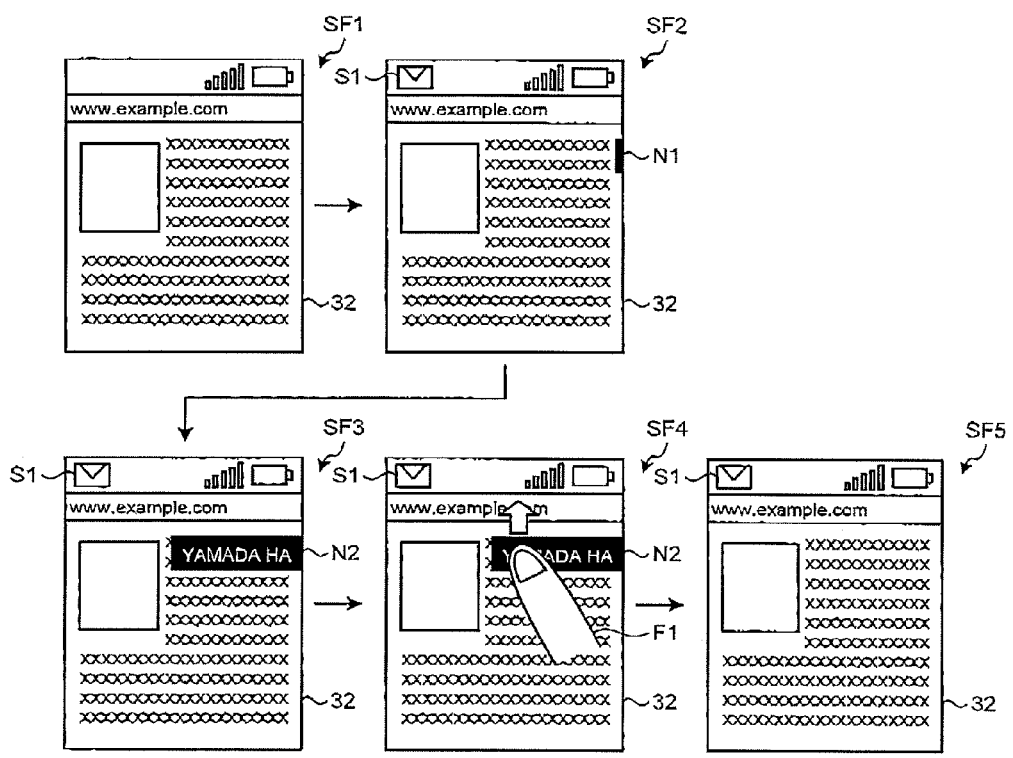
FIG. 10 is a diagram illustrating another example of the operation to cancel or postpone informing after scrolling of scrolling display starts.

The mobile phone 1 can also cancel or postpone display of informing information N2 after scrolling of the informing information N2 starts. FIG. 9 is a diagram illustrating an example of operation to cancel or postpone display of informing information N2 after scrolling of the informing information N2 starts. At Step SE1 illustrated in FIG. 9, a browser screen is displayed on the touch panel 32. Here, if an email arrives on the mobile phone 1, then as illustrated at Step SE2, the mobile phone 1 displays an informing symbol. N1 at an edge of the touch panel 32. Then, after a lapse of a predetermined time, as illustrated at Step SE3, the mobile phone 1 erases the informing symbol N1 and starts scrolling informing information N2.

When the user does not want the informing information N2 to be displayed or when the user determines after seeing part of the informing information N2 that informing is not necessary, as illustrated at Step SE4, he/she performs a sweep in a direction opposite to the scrolling direction in a display area of the informing information N2, by using his/her finger F1. When the sweep in the opposite direction is detected in the display area of the informing information N2, the mobile phone 1 cancels or postpones the scrolling. As a result, as illustrated at Step SE5, the informing information N2 is erased. While the sweep in the opposite direction is detected, the mobile phone 1 may scroll the informing information N2 in the opposite direction in accordance with the movement of the finger F1.

The mobile phone 1 can also cancel or postpone display of the informing information N2 when any other operation than a sweep in a direction opposite to the scrolling direction is detected. For example, when, as illustrated at Step SF4 illustrated in FIG. 10, a flick in a different direction than the scrolling direction is detected in a display area of informing information N2, the mobile phone 1 may cancel or postpone the scrolling of the informing information N2. The mobile phone 1 may cancel or postpone scrolling of informing information N2 when a long tap is detected in a display area of the informing information N2. Such operation that interferes with scrolling is intuitive as operation for stopping the scrolling. Scrolling may be canceled or postponed when a sweep or the like in a different direction than the scrolling direction is detected in an area other than the display area of the informing information N2.

Whether to cancel or postpone display of informing information N2 after scrolling starts may be determined based on the setting performed in advance by the user. Alternatively, operation may be changed according to the direction or type of detected operation, such as postponing display when a sweep in a direction opposite to the scrolling direction is detected in a display area of informing information N2, and canceling display when a flick in a direction intersecting the scrolling direction is detected. When flick operation in the direction intersecting the scrolling direction is adopted, by setting the operation direction to a direction going outward on the display screen, more intuitive operation can be provided.

The mobile phone 1 may perform a process associated with informing information N2 when predetermined operation is detected during scrolling of the informing information N2. For example, if the informing information N2 is information for informing of arrival of an email, then the mobile phone 1 may display a browsing screen for the arrived email on the touch panel 32 when predetermined operation is detected during scrolling of the informing information N2. The predetermined operation as referred to herein is, for example, operation (pinch-out operation) where two fingers are swept in different directions such that the informing information N2 is extended in a vertical direction. In this case, a visual effect may be performed such that the informing information N2 extended in the vertical direction is split and an email browsing screen appears from the split portion. The predetermined operation as referred to herein may be a sweep or flick in substantially the same direction as the scrolling direction or may be a sweep or flick inward on the display screen and in a direction intersecting the scrolling direction.

Figure 11:
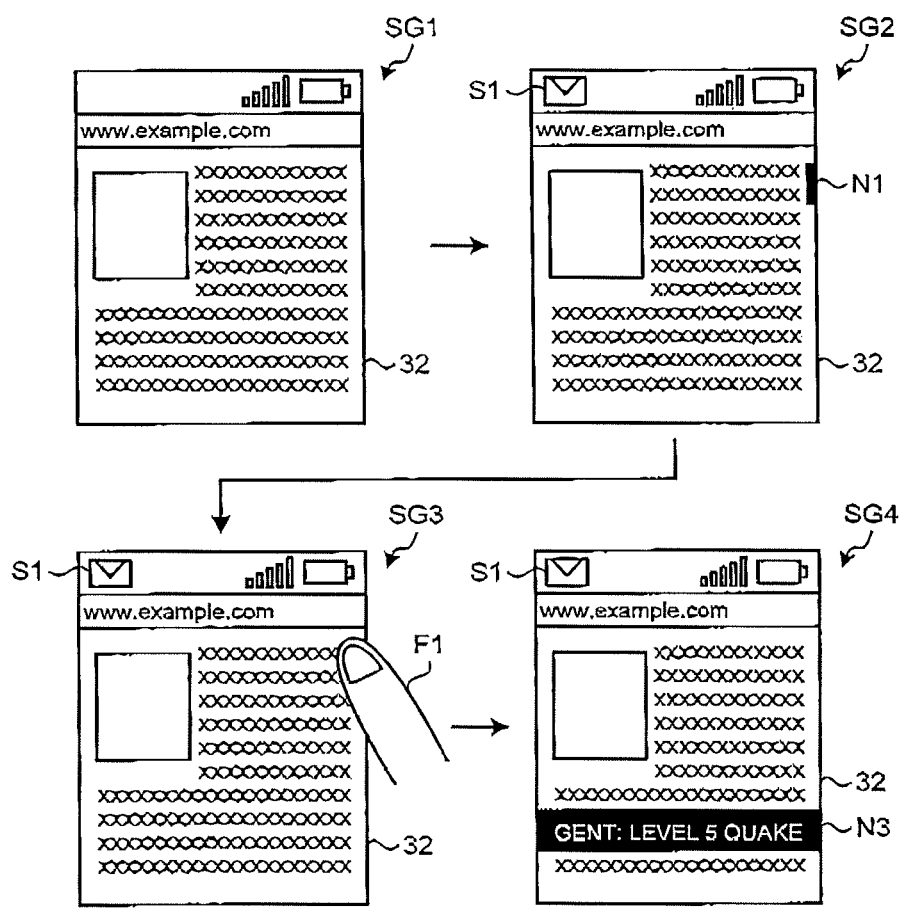
FIG. 11 is a diagram illustrating an example of informing performed when an email with a high degree of urgency arrives.

Even if operation to cancel or postpone display of informing information N2 is detected, for information with a high degree of urgency such as information about disasters, the mobile phone 1 performs informing by means of display. FIG. 11 is a diagram illustrating an example of informing performed when an email with a high degree of urgency arrives. At Step SG1 illustrated in FIG. 11, a browser screen is displayed on the touch panel 32. Here, if an email with a high degree of urgency arrives on the mobile phone 1, then as illustrated at Step SG2, the mobile phone 1 displays an informing symbol N1 at an edge of the touch panel 32. The degree of urgency of the email is determined by, for example, the sender or title of the email or the value of any other item in an email header.

Here, it is assumed that, as illustrated at Step SG3, operation where a user's finger F1 taps a display location of the informing symbol N1, i.e., operation to cancel or postpone display, is detected. Even if such operation for canceling or postponing is detected, when the degree of urgency of information to be informed is higher than a preset value, as illustrated at Step SG4, the mobile phone 1 scrolls informing information N3 indicating the content of the arrived email. In this case, in order to avoid the informing information N3 from becoming difficult to see due to the finger that taps the touch panel 32 blocking the informing information N3, scrolling of the informing information N3 can be started at a location different than the display location of the informing symbol N1. To indicate that the degree of urgency is high, the informing symbol N1 and the informing information N3 can be displayed in different modes than those for normal times.

By thus forcefully informing information with a high degree of urgency, the occurrence of a situation where information with a high degree of urgency is not provided to the user can be inhibited. Forced informing of information with a high degree of urgency is also performed when operation to cancel or postpone informing is detected after scrolling starts. It is also possible that, when information with a high degree of urgency is informed, operation to cancel or postpone is not accepted and informing is allowed to continue. The mobile phone 1 adopts a flow in which, when informing information N2 with a high degree of urgency is notified, operation to cancel or postpone is not accepted and informing is performed forcefully.

Figure 12:
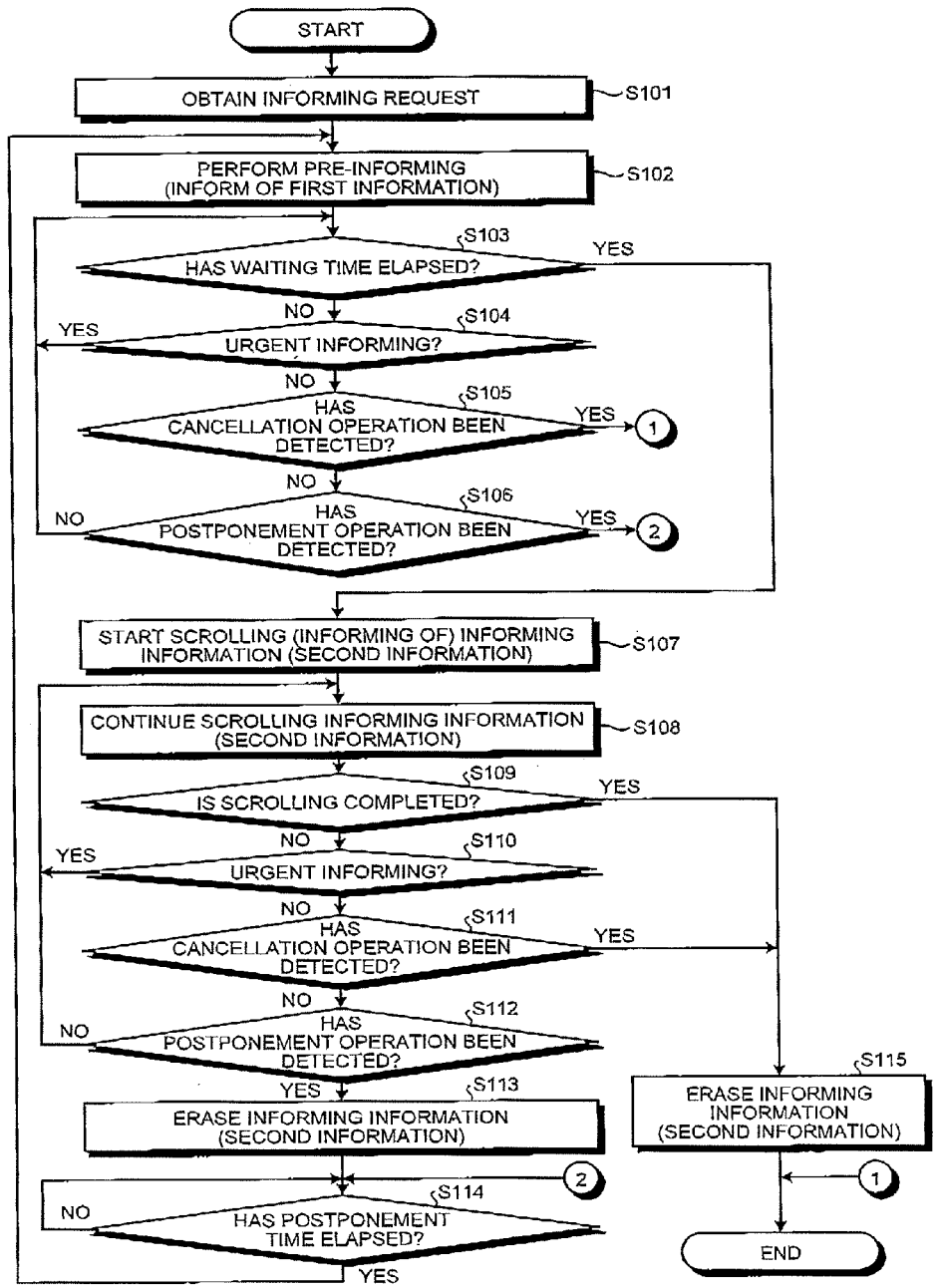
FIG. 12 is a flowchart illustrating a processing procedure of an informing process in the first embodiment.

Then, referring to FIG. 12, a processing procedure of an informing process will be described. FIG. 12 is a flowchart illustrating a processing procedure of an informing process in the first embodiment. The processing procedure illustrated in FIG. 12 is implemented by the control unit 22 executing the control program 24*a*.

As illustrated in FIG. 12, the control unit 22 first obtains an informing request at Step S101. Then, at Step S102, the control unit 22 performs pre-informing by displaying an informing symbol (first information). An informing request is issued when there arises a situation where informing to the user is required, such as arrival of an email. Then, at Step S103, the control unit 22 determines whether the waiting time has elapsed.

If the waiting time has not elapsed (No at Step S103), then at Step S104, the control unit 22 determines whether the degree of urgency of information to be informed is high. If the degree of urgency is high (Yes at Step S104), then the control unit 22 performs again those steps at and after Step S103. If the degree of urgency is not high (No at Step S104), then at Step S105, the control unit 22 determines whether cancellation operation has been detected. The cancellation operation is operation to instruct to cancel display of informing information N2. If cancellation operation has been detected (Yes at Step S105), then the control unit 22 ends the informing process.

If cancellation operation has not been detected (No at Step S105), then at Step S106, the control unit 22 determines whether postponement operation has been detected. The postponement operation is operation to instruct to postpone the start of scrolling of informing information. If postponement operation has been detected (Yes at Step S106), then at Step S114, the control unit 22 waits until the postponement time has elapsed. Thereafter, the control unit 22 performs again those steps at and after Step S102. If postponement operation has not been detected (No at Step S106), then the control unit 22 performs again those steps at and after Step S103.

If the waiting time has elapsed (Yes at Step S103), then at Step S107, the control unit 22 starts scrolling informing information N2 (second information). Then, at Step S108, the control unit 22 continues scrolling the informing information N2. Subsequently, at Step S109, the control unit 22 determines whether the scrolling of the informing information N2 is completed. If the scrolling of the informing information N2 is completed (Yes at Step S109), then at Step S115, the control unit 22 erases the informing information N2 and ends the informing process.

If the scrolling of the informing information N2 is not completed (No at Step S109), then at Step S110, the control unit 22 determines whether the degree of urgency of the informing information N2 is high. If the degree of urgency is high (Yes at Step S110), then the control unit 22 performs again those steps at and after Step S108. If the degree of urgency is not high (No at Step S110), then at Step S111, the control unit 22 determines whether cancellation operation has been detected. The cancellation operation at Step S111 may be different than that at Step S105. If cancellation operation has been detected (Yes at Step S111), then at Step S115, the control unit 22 erases the informing information N2 and ends the informing process.

If cancellation operation has not been detected (No at Step S111), then at Step S112, the control unit 22 determines whether postponement operation has been detected. The postponement operation at Step S112 may be different than that at Step S106. If postponement operation has been detected (Yes at Step S112), then at Step S113, the control unit 22 erases the informing information N2, and at Step S114, the control unit 22 waits until the postponement time has elapsed. Thereafter, the control unit 22 performs again those steps at and after Step S102. If postponement operation has not been detected (No at Step S112), then the control unit 22 performs again those steps at and after Step S108.

As has been described above, in the first embodiment, the mobile phone 1 performs pre-informing and then displays informing information. In the first embodiment, the mobile phone 1 cancels or postpones display of informing information, according to operation detected during pre-informing and during display of the informing information. Hence, the mobile phone 1 according to the first embodiment can inhibit user activity from being hindered by informing, while increasing the probability of providing content to be informed to the user.

Although in the above-described embodiment the case of performing informing during Web browsing is described, the mobile phone 1 also performs informing in the same manner in situations other than during Web browsing. For example, in situations such as during editing of an email and during playback of a moving image, too, when there is arrival of an email, etc., the mobile phone 1 performs pre-informing and then displays informing information.

Although in the above-described embodiment operation for canceling or postponing informing is detected based on the signal from the touch panel 32, the mobile phone 1 may detect operation for canceling or postponing informing based on the signal from the operating unit 13. For example, the mobile phone 1 may cancel informing when the button 13a is pressed during pre-informing and during display of informing information, and may postpone informing when the button 13b is pressed. The mobile phone 1 may cancel postponement when the button 13a is short-pressed during pre-informing and during display of informing information, and may cancel informing when the button 13a is long-pressed. A pointing device may be provided on the mobile phone 1 and when operation corresponding to a tap, sweep, or flick in the above-described embodiment is detected based on the signal from the pointing device during pre-informing and during display of informing information, the mobile phone 1 may cancel or postpone informing.

A detecting unit that detects attitude or movement, such as an acceleration sensor, gyro sensor, or geomagnetic sensor, may be provided on the mobile phone 1 and the mobile phone 1 may distinguish between operation for canceling informing and operation for postponing informing, based on the change in detected attitude or movement. For example, the mobile phone 1 may adopt operation where the mobile phone 1 is shaken horizontally during pre-informing and during display of informing information, as operation to cancel informing, and may adopt operation where the mobile phone 1 is shaken vertically, as operation to postpone informing. In this case, the entire mobile phone 1 functions as an operating unit that accepts user operation.

A camera may be provided on the mobile phone 1 and the mobile phone 1 may distinguish between operation for canceling informing and operation for postponing informing, based on video shot by the camera. For example, the mobile phone 1 may cancel informing when video of the user waving his/her hand horizontally is shot during pre-informing and during display of informing information, and may postpone informing when video of the user opening and closing his/her hand is shot. In this case, the camera functions as an operating unit that accepts user operation.

A detecting unit capable of detecting the user's hand held over the mobile phone 1, such as an illumination sensor or a proximity sensor, may be provided on the mobile phone 1, and the mobile phone 1 may distinguish between operation for canceling informing and operation for postponing informing, based on the user's hand held over the mobile phone 1. For example, the mobile phone 1 may cancel informing when the user holds his/her hand over the mobile phone 1 for a longer period of time than a threshold value during pre-informing and during display of informing information, and may postpone informing when the user holds his/her hand over the mobile phone 1 for a shorter period of time than the threshold value. In this case, the detecting unit such as the illumination sensor or a proximity sensor functions as an operating unit that accepts user operation.

The mobile phone 1 may be configured by a deformable housing such as a flip type or a slide type, and may distinguish between operation for canceling informing and operation for postponing informing, based on the change in the shape of the housing. For example, the mobile phone 1 may cancel informing when the housing is changed from an open state to a closed state during pre-informing and during display of informing information, and may postpone informing when the housing is changed from an open state to a half-open state. In this case, the entire mobile phone 1 functions as an operating unit that accepts user operation.

When the touch panel 32 is capable of detecting the pressure of the contact, the mobile phone 1 may distinguish between operation for canceling informing and operation for postponing informing, based on the detected pressure of the contact. For example, the mobile phone 1 may cancel informing when the pressure of a tap or the like performed during pre-informing and during display of informing information is higher than a threshold value, and may postpone informing when the pressure is lower than the threshold value.

Although in the above-described embodiment informing to the user is performed by displaying information on the touch panel 32, how to inform is not limited to that in the above-described embodiment. For example, informing may be performed using sound or vibration.

Figure 13:
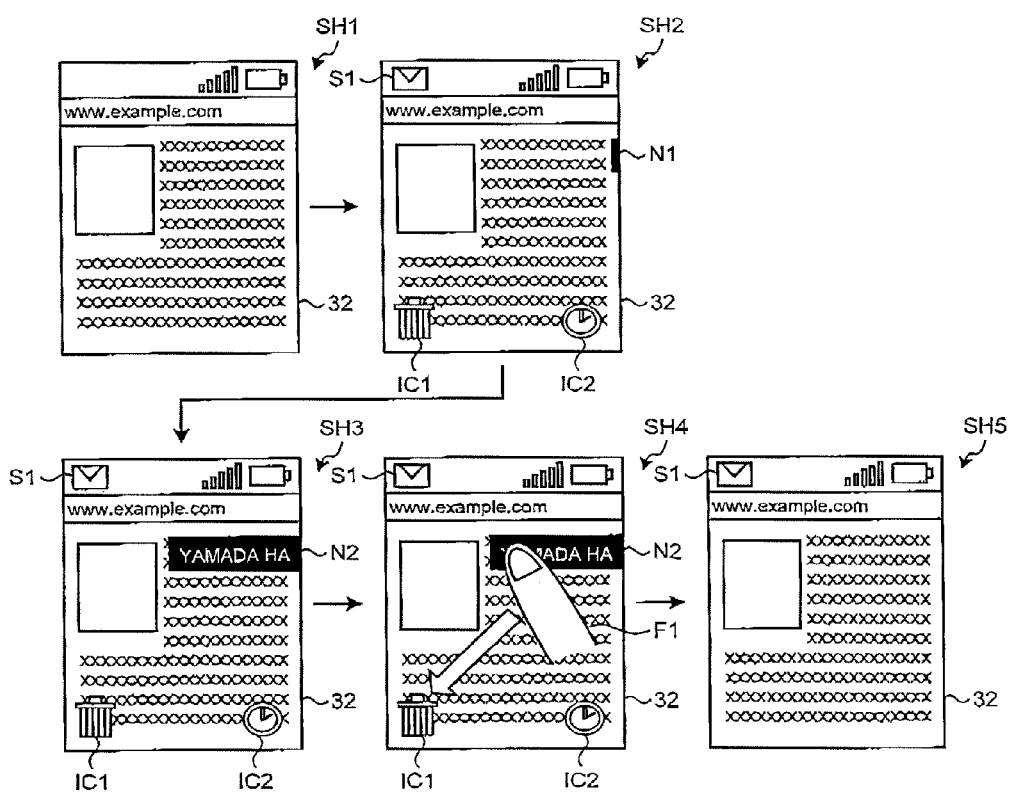
FIG. 13 is a diagram illustrating an example of another operation detected during display of informing information.
Figure 14:
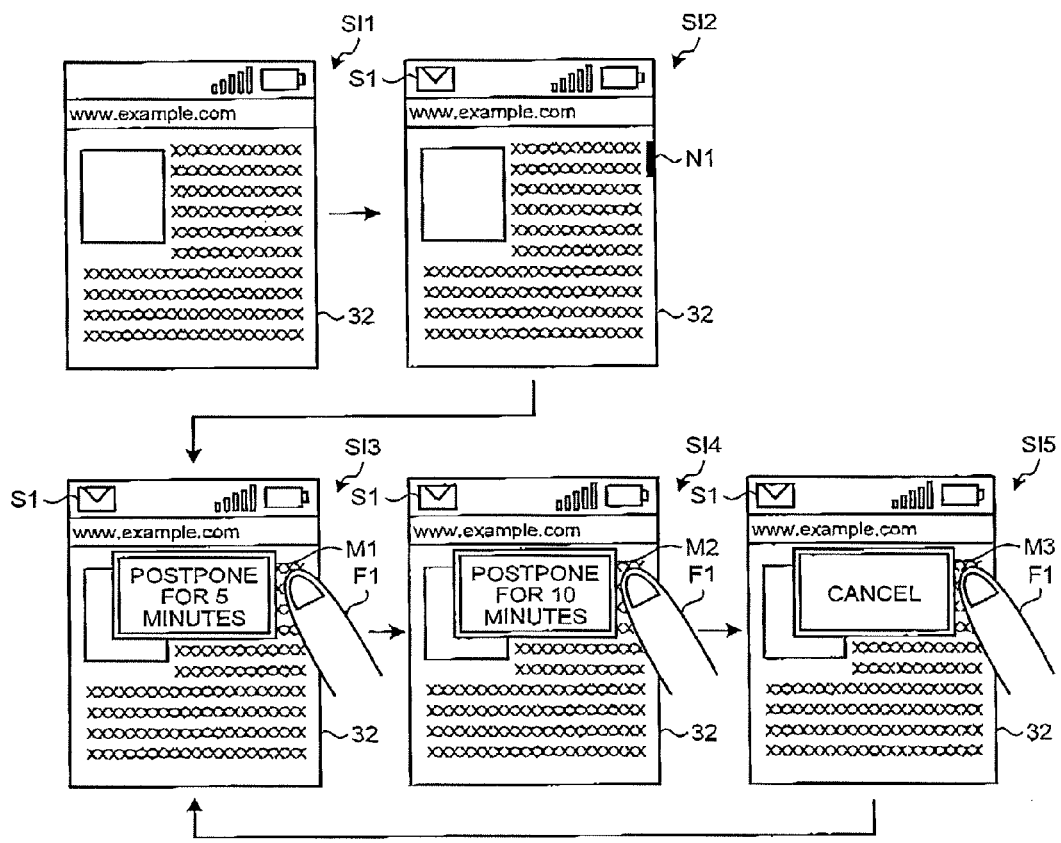
FIG. 14 is a diagram illustrating an example of another operation detected during pre-informing.

Although in the above-described embodiment the control unit 22 detects a tap, a flick, or the like, as operation for canceling or postponing informing, operation detected by the control unit 22 during pre-informing and during display of informing information is not limited to that in the above-described embodiment. Referring to FIGS. 13 and 14, other examples of operation detected during pre-informing and during display of informing information will be described.

FIG. 13 is a diagram illustrating an example of another operation detected during display of informing information. At Step SH1 illustrated in FIG. 13, a browser screen is displayed on the touch panel 32. Here, if an email arrives on the mobile phone 1, then as illustrated at Step SH2, the mobile phone 1 displays an informing symbol N1 at an edge of the touch panel 32. The mobile phone 1 further displays a trash icon IC1 and a clock icon IC2 on the touch panel 32. Then, after a lapse of a predetermined time, as illustrated at Step SH3, the mobile phone 1 erases the informing symbol N1 and starts scrolling informing information N2.

When the user does not want the informing information N2 to be displayed or when the user determines after seeing part of the informing information N2 that informing is not necessary, as illustrated at Step SH4, he/she performs a flick in a direction of the trash icon IC1, in a display area of the informing information N2. When the flick in the direction of the trash icon IC1 is detected in the display area of the informing information N2, the mobile phone 1 cancels the display. As a result, as illustrated at Step SH5, the informing information N2 is erased. This icon may be displayed after touch operation on the touch panel 32 is detected. When the user touches the informing information N2, it is assumed that the user has an interest in the informing information N2, and when, in contrast, the user does not touch the informing information N2, it is assumed that the user does not have an interest in the informing information N2. By performing display after detecting touch operation, the mobile phone 1 can display a related icon, with interference with browsing Web pages by the user minimized.

The mobile phone 1 cancels display of informing information N2 in the same manner when detecting a sweep from a display area of the informing information N2 to a trash icon IC1, instead of a flick in a direction of the trash icon IC1. The mobile phone 1 postpones display of informing information N2 when a flick in a direction of a clock icon IC2 is detected in a display area of the informing information N2 or when a sweep from the display area of the informing information N2 to the clock icon IC2 is detected.

The shapes of the icons illustrated in FIG. 13 are an example and the shapes of icons used for canceling or postponing display of informing information N2 are not limited to this example. Icons for other applications may be further displayed. For example, when a flick in a direction of a predetermined icon is detected in a display area of informing information N2 or when a sweep from the display area of the informing information N2 to the predetermined icon is detected, the mobile phone 1 may display the content of an email corresponding to the informing information N2 on the touch panel 32.

FIG. 14 is a diagram illustrating an example of another operation detected during pre-informing. At Step SI1 illustrated in FIG. 14, a browser screen is displayed on the touch panel 32. Here, if an email arrives on the mobile phone 1, then as illustrated at Step S12, the mobile phone 1 displays an informing symbol N1 at an edge of the touch panel 32.

When the user does not want informing information N2 to be displayed, as illustrated at Step SI3, he/she touches the touch panel 32 at a display location of the informing symbol N1 with his/her finger F1 so as to press the informing symbol N1. When the touch at the display location of the informing symbol N1 is detected, the mobile phone 1 displays a message M1 indicating that display will be postponed for 5 minutes, on the touch panel 32 for a predetermined period of time. When removal of the finger F1 from the touch panel 32 is detected during this period of time, the mobile phone 1 performs pre-informing again 5 minutes later.

When the finger F1 remains touching the touch panel 32 even after a lapse of the predetermined period of time, as illustrated at Step SI4, the mobile phone 1 displays a message M2 indicating that display will be postponed for 10 minutes, on the touch panel 32 for a predetermined period of time. When removal of the finger F1 from the touch panel 32 is detected during this period of time, the mobile phone 1 performs pre-informing again 10 minutes later.

When the finger F1 remains touching the touch panel 32 even after a lapse of the predetermined period of time, as illustrated at Step S15, the mobile phone 1 displays a message M3 indicating that display will be canceled, on the touch panel 32 for a predetermined period of time. When removal of the finger F1 from the touch panel 32 is detected during this period of time, the mobile phone 1 cancels informing. When the finger F1 remains touching the touch panel 32 even after a lapse of the predetermined period of time, the mobile phone 1 returns to the stage at Step SI3.

The length of time for which informing is postponed and the number of stages are not limited to those of the example illustrated in FIG. 14. For example, as postponement time, the mobile phone 1 may first present 0 minutes and then present 10 minutes and then present 20 minutes. The order in which messages indicating a period of time for which informing is postponed or indicating cancellation are displayed may be any. The user may be allowed to make a selection other than postponement and cancellation. For example, the mobile phone 1 may display the message "display of an email" for a predetermined period of time, and when removal of the finger F1 from the touch panel 32 is detected during this period of time, the mobile phone 1 may display the content of an email corresponding to informing information N2 on the touch panel 32.

Figure 15:
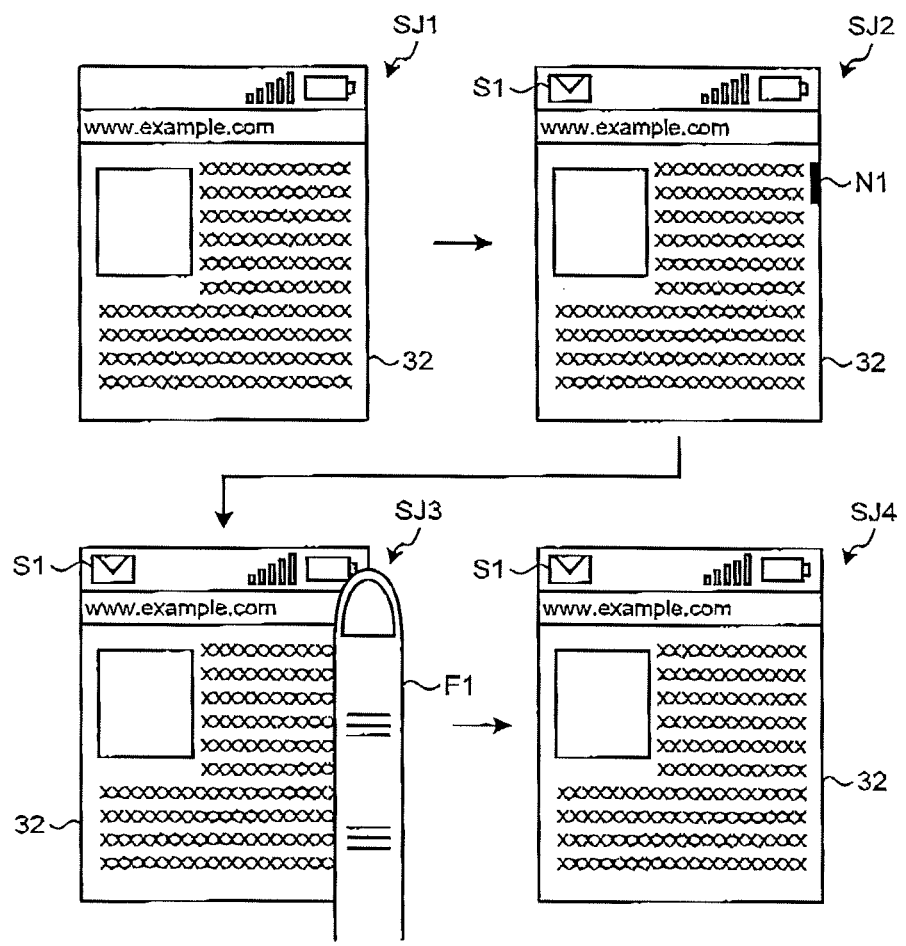
FIG. 15 is a diagram illustrating an example of operation to cancel or postpone informing of information with a high degree of urgency.

Although in the above-described embodiment information with a high degree of urgency is forcefully informed, for information with a high degree of urgency, too, informing may be allowed to be canceled or postponed. In order to avoid informing of information with a high degree of urgency from being canceled or postponed without intention, operation for canceling or postponing informing of information with a high degree of urgency can be made different from operation for canceling or postponing informing of normal information. Referring to FIG. 15, an example of operation to cancel or postpone informing of information with a high degree of urgency will be described.

FIG. 15 is a diagram illustrating an example of operation to cancel or postpone informing of information with a high degree of urgency. At Step SJ1 illustrated in FIG. 15, a browser screen is displayed on the touch panel 32. Here, if an email arrives on the mobile phone 1, then as illustrated at Step SJ2, the mobile phone 1 displays an informing symbol N1 at an edge of the touch panel 32.

When, even if the information has a high degree of urgency, the user does not want to be interfered with his/her browsing by informing for a reason such as the user browsing important information on the browser screen, as illustrated at Step SJ3, he/she touches a right edge of the touch panel 32 with his/her finger F1 so as to press the whole side where the informing symbol N1 is displayed. This operation is like operation to interfere with informing so as not to start scrolling anywhere on the side where the informing symbol N1 is displayed, and thus is intuitive and easy to be performed as operation for canceling or postponing all informing.

When a touch on the whole side where the informing symbol N1 is displayed is detected, the mobile phone 1 cancels or postpones informing regardless of the degree of urgency. As a result, as illustrated at Step SJ4, informing information N2 is not displayed.

A second embodiment will be described below. Although in the first embodiment a mobile phone waits for a predetermined period of time when informing is postponed, the waiting period of time may be dynamically changed according to the situation. In the second embodiment an example in which the waiting period of time is dynamically changed according to the situation will be described. In the following description, the same parts as those described already are denoted by the same reference signs as those for the parts described already. Furthermore, overlapping description may be omitted.

Figure 16:
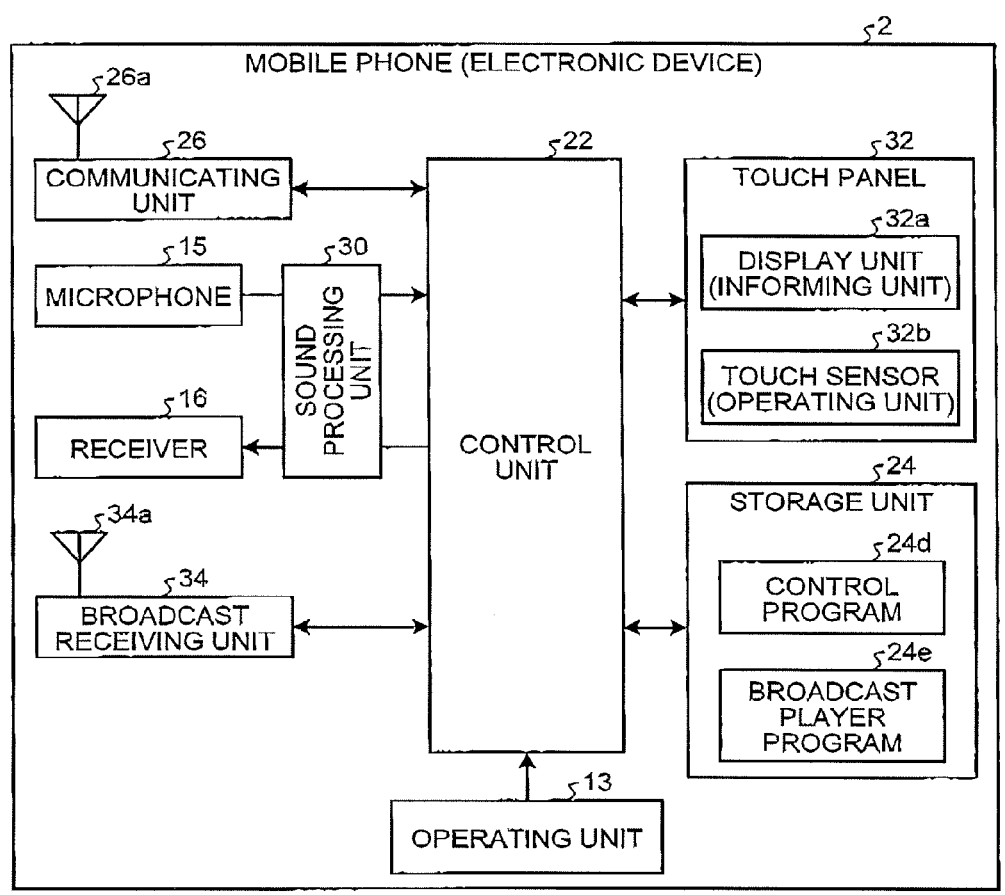
FIG. 16 is a block diagram of a mobile phone according to a second embodiment.

First of all, referring to FIG. 16, a configuration of a mobile phone (electronic device) 2 according to the second embodiment will be described. FIG. 16 is a block diagram of the mobile phone 2. As illustrated in FIG. 16, the mobile phone 2 includes the operating unit 13, the microphone 15, the receiver 16, the control unit 22, the storage unit 24, the communicating unit 26, the sound processing unit 30, the touch panel 32, and a broadcast receiving unit 34.

The broadcast receiving unit 34 has an antenna 34a and receives, for example, television or radio broadcasts. The broadcast receiving unit 34 performs a process such as demodulation on a received broadcast wave and outputs an obtained signal to the control unit 22.

In the second embodiment, the programs stored in the storage unit 24 include a control program 24d and a broadcast player program 24e. The control program 24d provides a function relating to various types of control for allowing the mobile phone 2 to operate. The function provided by the control program 24d includes the function of controlling informing of a user about various types of information. The broadcast player program 24e provides the function of performing display of video or playback of sound, based on a signal inputted from the broadcast receiving unit 34.

Figure 17:
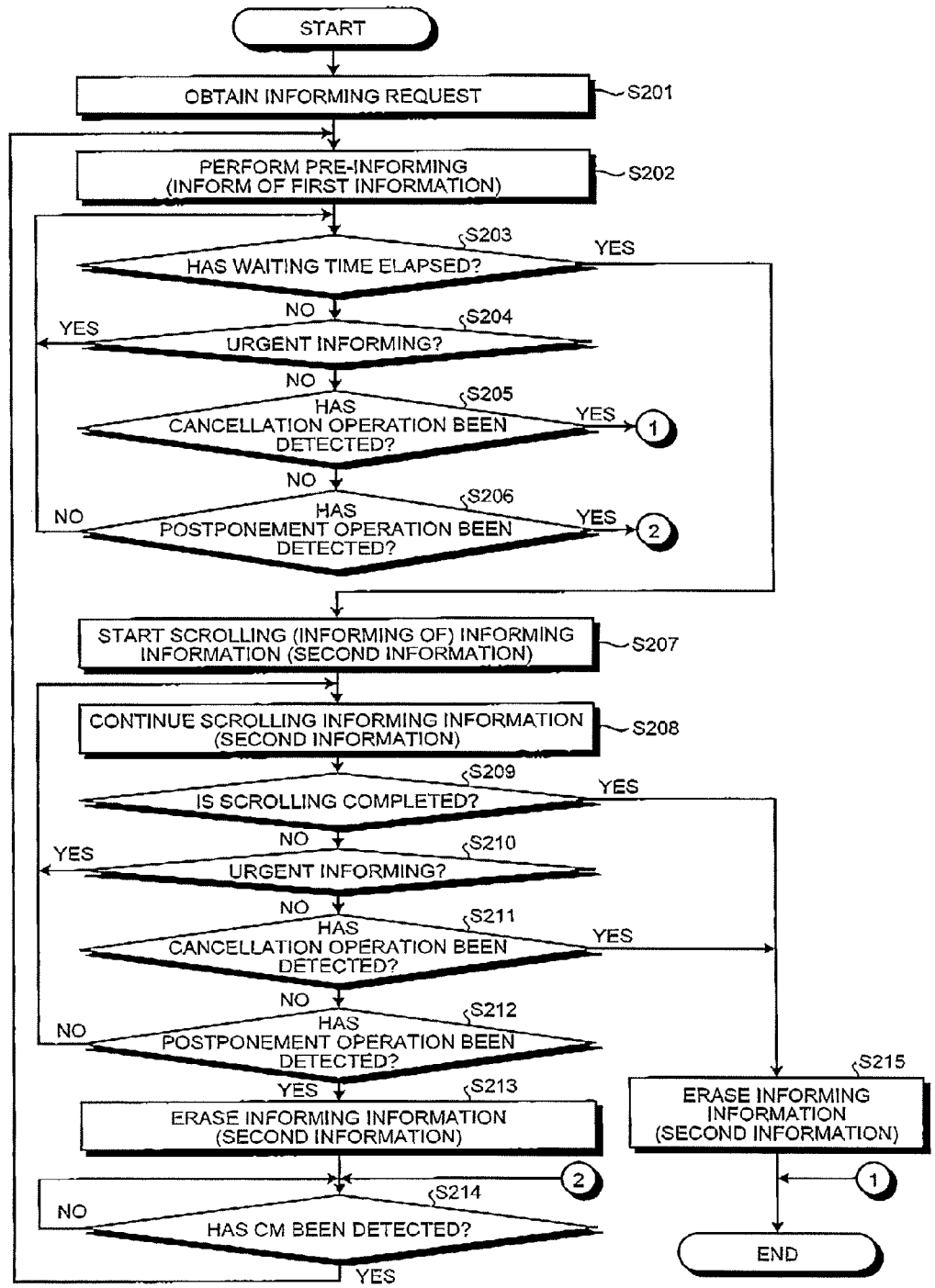
FIG. 17 is a flowchart illustrating a processing procedure of an informing process in the second embodiment.

Then, referring to FIG. 17, a processing procedure of an informing process will be described. FIG. 17 is a flowchart illustrating a processing procedure of an informing process in the second embodiment. The processing procedure illustrated in FIG. 17 is implemented by the control unit 22 executing the control program 24d during playback of a broadcast.

As illustrated in FIG. 17, the control unit 22 first obtains an informing request at Step S201. Then, at Step S202, the control unit 22 performs pre-informing by displaying an informing symbol (first information). Then, at Step S203, the control. unit 22 determines whether the waiting time has elapsed.

If the waiting time has not elapsed (No at Step S203), then at Step S204, the control unit 22 determines whether the degree of urgency of information to be informed is high. If the degree of urgency is high (Yes at Step S204), then the control unit 22 performs again those steps at and after Step S203. If the degree of urgency is not high (No at Step S204), then at Step S205, the control unit 22 determines whether cancellation operation has been detected. The cancellation operation is operation to instruct to cancel display of informing information. If cancellation operation has been detected (Yes at Step S205), then the control unit 22 ends the informing process.

If cancellation operation has not been detected (No at Step S205), then at Step S206, the control unit 22 determines whether postponement operation has been detected. The postponement operation is operation to instruct to postpone display of informing information. If postponement operation has been detected (Yes at Step S206), then at Step S214, the control unit 22 waits until a commercial message (CM) is detected in a broadcast being played back. Detection of a CM may be implemented by using conventional techniques. Thereafter, the control unit 22 performs again those steps at and after Step S202. If postponement operation has not been detected (No at Step S206), then the control unit 22 performs again those steps at and after Step S203.

If the waiting time has elapsed (Yes at Step S203), then at Step S207, the control unit 22 starts scrolling informing information (second information) N2. Then, at Step S208, the control unit 22 continues scrolling the informing information N2. Subsequently, at Step S209, the control unit 22 determines whether the scrolling of the informing information N2 is completed. If the scrolling of the informing information N2 is completed (Yes at Step S209), then at Step S215, the control unit 22 erases the informing information N2 and ends the informing process.

If the scrolling of the informing information N2 is not completed (No at Step S209), then at Step S210, the control unit 22 determines whether the degree of urgency of information to be informed is high. If the degree of urgency is high (Yes at Step S210), then the control unit 22 performs again those steps at and after Step S208. If the degree of urgency is not high (No at Step S210), then at Step S211, the control unit 22 determines whether cancellation operation has been detected. The cancellation operation at Step S211 may be different than that at Step S205. If cancellation operation has been detected (Yes at Step S211), then at Step S215, the control unit 22 erases the informing information N2 and ends the informing process.

If cancellation operation has not been detected (No at Step S211), then at Step S212, the control unit 22 determines whether postponement operation has been detected. The postponement operation at Step S212 may be different than that at Step S206. If postponement operation has been detected (Yes at Step S212), then at Step S213, the control unit 22 erases the informing information N2, and at Step S214, the control unit 22 waits until a CM is detected in a broadcast being played back. Thereafter, the control unit 22 performs again those steps at and after Step 3202. If postponement operation has not been detected (No at Step S212), then the control unit 22 performs again those steps at and after Step S208.

As has been described above, in the second embodiment, when informing is postponed, the mobile phone 2 performs informing again at timing at which a CM is detected in a broadcast being played back. Hence, the mobile phone 2 according to the second embodiment can inhibit broadcast viewing by the user from being hindered by informing.

When the waiting period of time is dynamically changed according to the situation, the timing at which postponed informing is performed again is not limited to timing at which a CM is detected in a broadcast being played back. By detecting timing at which user activity is suspended and performing informing again at the timing, the user activity can be inhibited from being hindered by informing. The timing at which the user activity is suspended is timing at which information provided to the user is switched to another, e.g., timing at which a screen displayed on the touch panel 32 is switched to another.

A third embodiment will be described below. Although in the first embodiment the case of informing of arrival of an email is described, the techniques of the present disclosure can also be used for informing of information other than arrival of an email. For example, the techniques of the present disclosure can be used to perform informing when there is an incoming call or when a registered schedule notification time has come or when the battery power is reduced to a predetermined value or less. In the third embodiment, an example of informing of information other than arrival of an email will be described.

Figure 18:
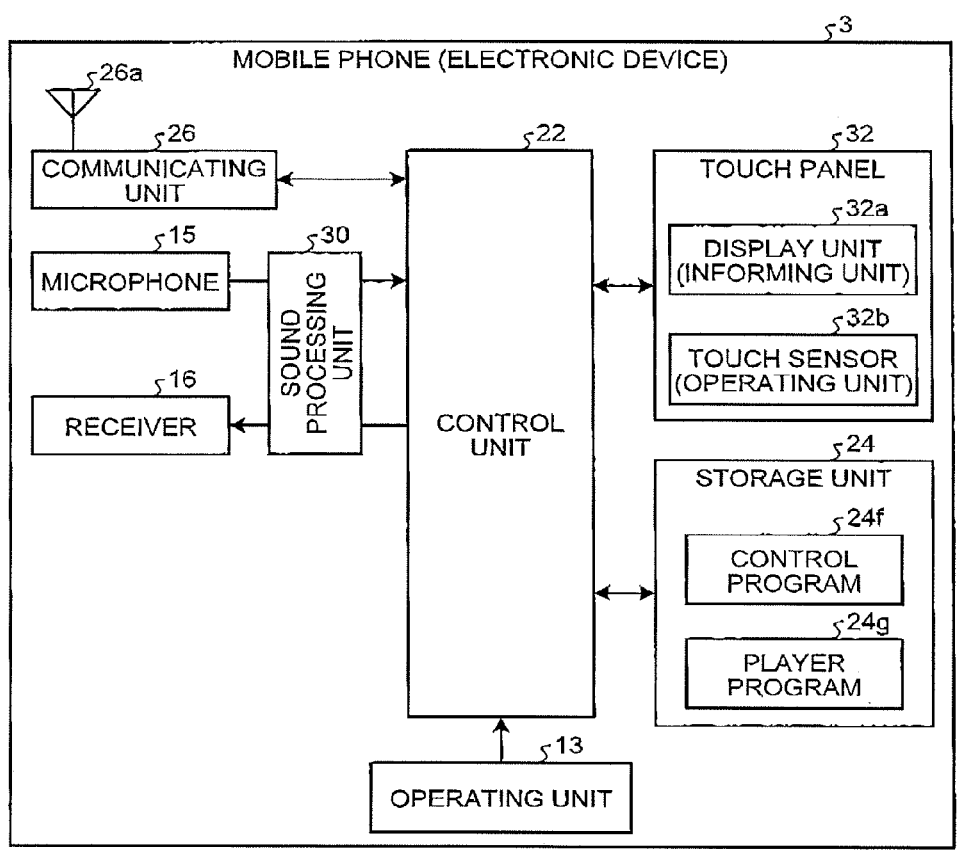
FIG. 18 is a block diagram of a mobile phone according to a third embodiment.

First of all, referring to FIG. 18, a configuration of a mobile phone (electronic device) 3 according to the third embodiment will be described. FIG. 18 is a block diagram of the mobile phone 3. As illustrated in FIG. 18, the mobile phone 3 includes the operating unit 13, the microphone 15, the receiver 16, the control unit 22, the storage unit 24, the communicating unit 26, the sound processing unit 3D, and the touch panel 32.

In the third embodiment, the programs stored in the storage unit 24 include a control program 24f and a player program 24g. The control program 24f provides a function relating to various types of control for allowing the mobile phone 3 to operate. The function provided by the control program 24f includes the function of controlling informing of a user about various types of information. The player program 24g provides the function of performing playback of music data or video data. Music data or video data to be played back may be stored in the storage unit 24 or may be obtained from other devices such as a server, by communication performed by the communicating unit 26.

Figure 19:
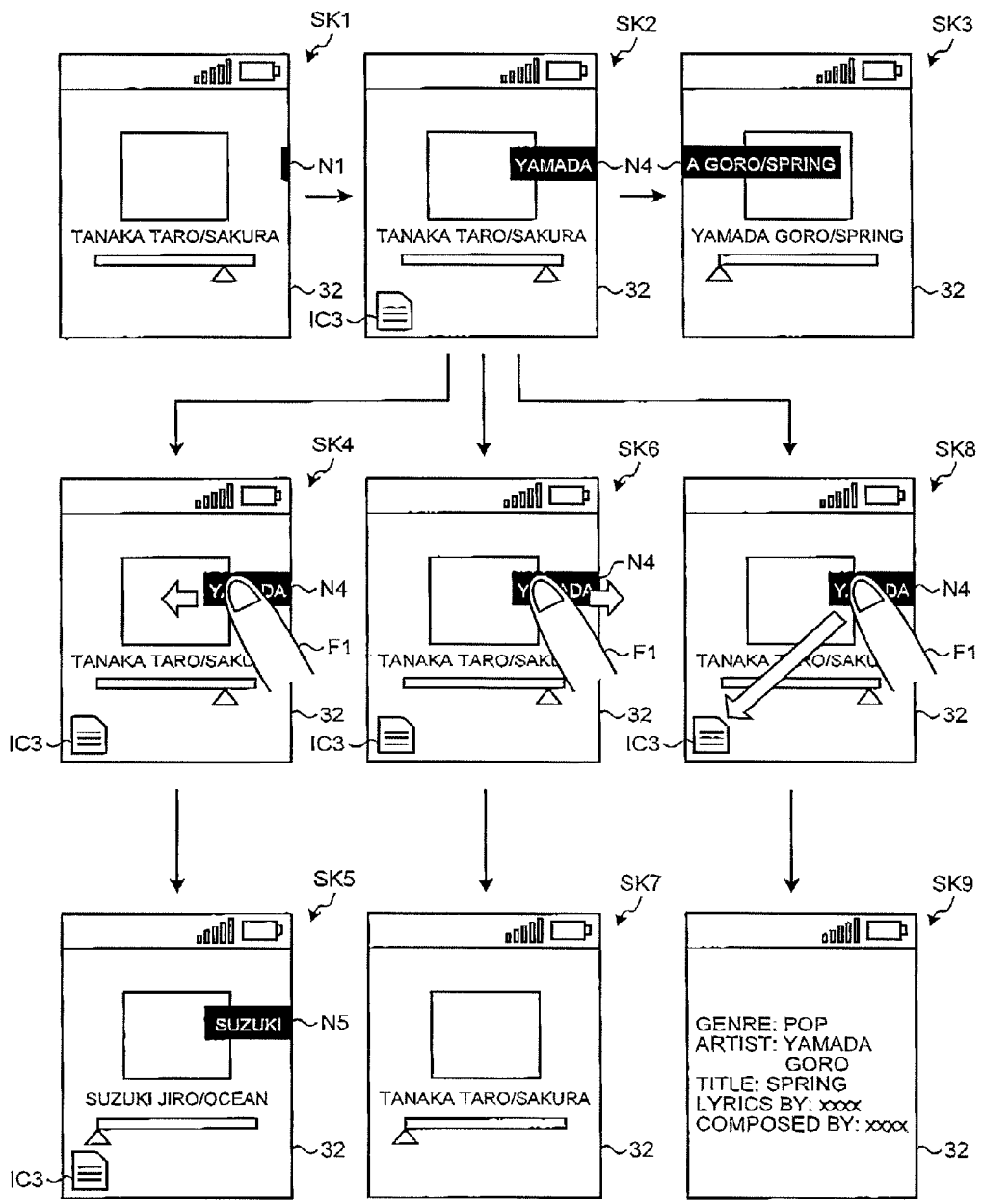
FIG. 19 is a diagram illustrating an example of informing performed during playback of music data.

Then, referring to FIG. 19, an example of informing of various types of information which is performed based on the informing function provided by the control program 24f will be described. FIG. 19 is a diagram illustrating an example of informing performed during playback of music data. At Step SK1 illustrated in FIG. 19, a music playback screen based on the function provided by the player program 24g is displayed on the touch panel 32. Namely, at a scene at Step SK1, the user uses the mobile phone 3 to enjoy music.

When a piece of music being played back is coming to its end, as illustrated at Step SK1, the mobile phone 3 displays an informing symbol (first information) N1 at a part of the touch panel 32, e.g., at the right edge of the touch panel 32. After displaying the informing symbol N1 for a predetermined time, as illustrated at Step SK2, the mobile phone 3 starts scrolling informing information (second information) N4 including the performer and title of a piece of music to be played back next, from right to left, for example. At this time, the mobile phone 3 displays a detail display icon IC3 on the touch panel 32.

When the user does not particularly perform any operation, as illustrated at Step SK3, the informing information N4 is scrolled to its end and playback of the next piece of music starts after playback of the current piece of music is finished. As such, to inform of a piece of music to be played back next, the mobile phone 3 performs pre-informing and display of informing information.

If the user does not want to listen to the piece of music indicated by the informing information N4, then as illustrated at Step SK4, he/she performs a flick in a scrolling direction in a display area of the informing information N4. When the flick in the scrolling direction is detected in the display area of the informing information N4, as illustrated at Step SK5, the mobile phone 3 skips the piece of music indicated by the informing information N4 and starts playback of the next piece of music. At this time, the mobile phone 3 may display informing information N5 indicating the piece of music whose playback has started. When a flick in the scrolling direction is detected in a display area of the informing information N5, the mobile phone 3 may start playback of a further next piece of music.

If the user wants to listen to the piece of music again whose playback reaches the end, then as illustrated at Step SK6, he/she performs a flick in a direction opposite to the scrolling direction in the display area of the informing information N4. When the flick in the direction opposite to the scrolling direction is detected in the display area of the informing information N4, as illustrated at Step SK7, the mobile phone 3 plays back the piece of music whose playback is coming to the end, from the start.

If the user wants to know detailed information about the piece of music indicated by the informing information N4, then as illustrated at Step SK8, he/she performs a sweep from the display area of the informing information N4 to the detail display icon IC3. When the sweep from the display area of the informing information N4 to the detail display icon IC3 is detected, as illustrated at Step SK9, the mobile phone 3 displays detailed information about the piece of music indicated by the informing information N4, on the touch panel 32.

As has been described above, the third embodiment explains an example of using the techniques of the present disclosure for playback of music data. By using the techniques of the present disclosure for playback of music data, operability which is intuitive and easy to implement can be achieved while providing the user with useful information. The operation illustrated in FIG. 19 is an example and thus the type, direction, etc., of the operation may be appropriately changed.

Figure 20:
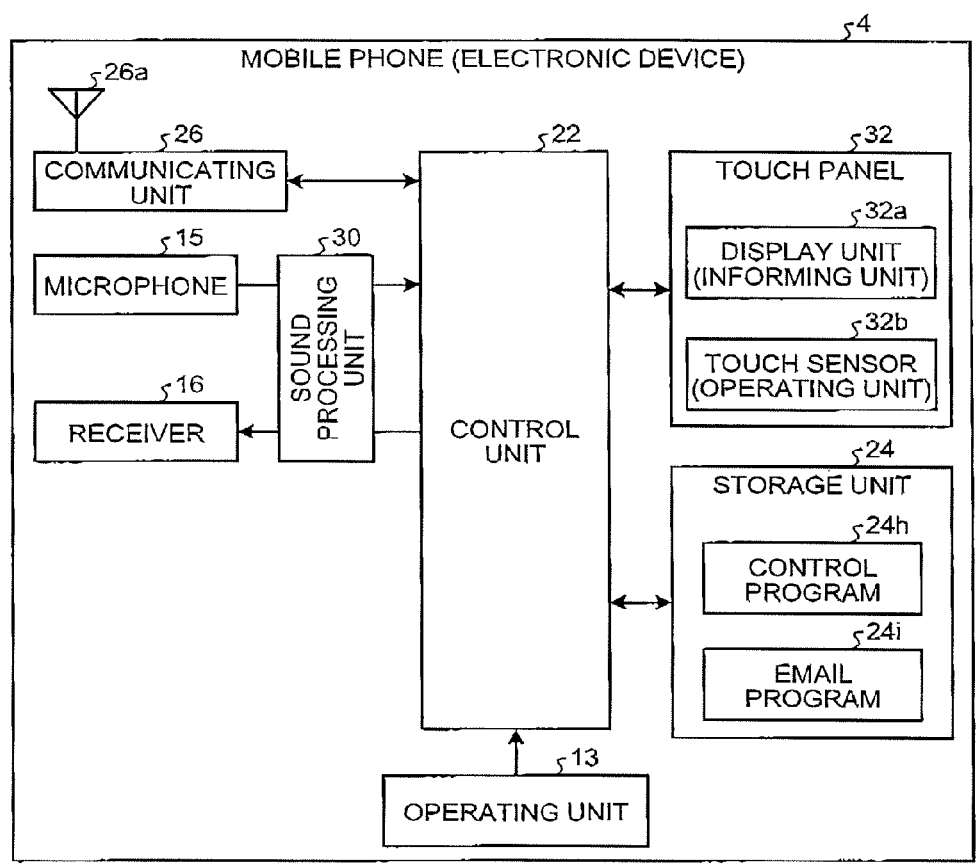
FIG. 20 is a block diagram of a mobile phone according to a fourth embodiment.

A fourth embodiment will be described below. First of all, referring to FIG. 20, a configuration of a mobile phone (electronic device) 4 according to a fourth embodiment will be described. FIG. 20 is a block diagram of the mobile phone 4. As illustrated in FIG. 20, the mobile phone 4 includes the operating unit 13, the microphone 15, the receiver 16, the control unit 22, the storage unit 24, the communicating unit 26, the sound processing unit 30, and the touch panel 32.

In the fourth embodiment, the programs stored in the storage unit 24 include a control program 24h and an email program 24i. The control program 24h provides a function relating to various types of control for allowing the mobile phone 4 to operate. The function provided by the control program 24h includes the function of controlling informing of a user about various types of information. The email program 24i provides an email function.

Figure 21:
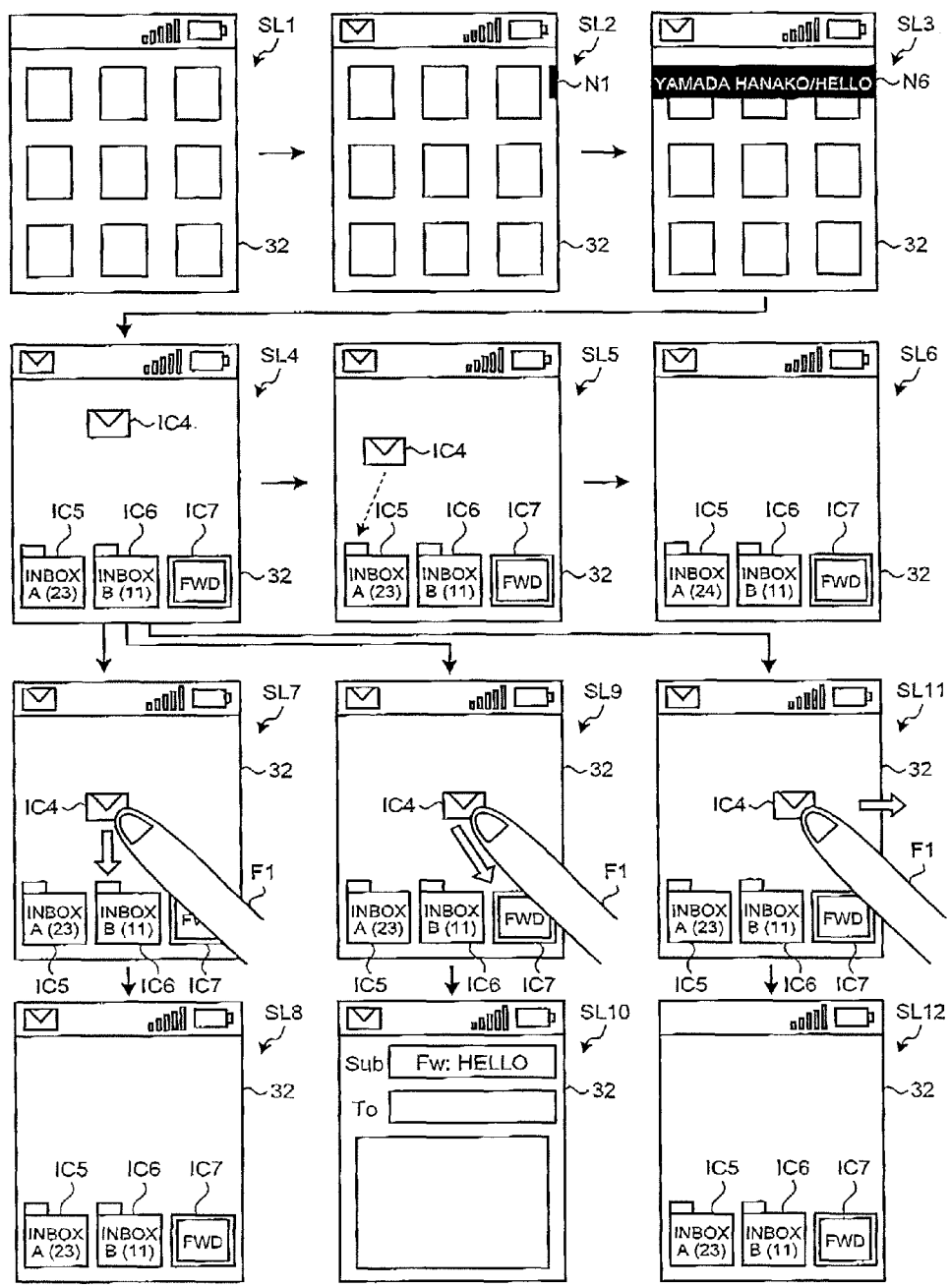
FIG. 21 is a diagram illustrating an example of informing performed when an email arrives.

Then, referring to FIG. 21, an example of informing of various types of information which is performed based on the informing function provided by the control program 24h will be described. FIG. 21 is a diagram illustrating an example of infolming performed when an email arrives. At Step SL1 illustrated in FIG. 21, a default screen (also referred to as a desktop, a home screen, or a wallpaper) is displayed on the touch panel 32. On the default screen there are arranged icons for executing various applications.

Here, if an email arrives on the mobile phone 4, then as illustrated at Step SL2, the mobile phone 4 displays an informing symbol (first information) N1 at a part of the touch panel 32, e.g., at the right edge of the touch panel 32. Subsequently, as illustrated at Step SL3, the mobile phone 4 scrolls informing information (second information) N6 including the sender and title of the arrived email, from right to left, for example. By this, the user can know a summary of the arrived email.

When the scrolling of the informing information N6 is completed, as illustrated at Step SL4, the mobile phone 4 displays an email icon IC4 corresponding to the arrived email, at the top of the touch panel 32. The mobile phone 4 also displays, at the bottom of the touch panel 32, a folder icon 105 corresponding to an inbox folder A, a folder icon 106 corresponding to an inbox folder B, and a forward icon IC7 corresponding to a forward function.

When the user does not particularly perform any operation, the email icon 104 is displayed in animation such that the email icon IC4 moves on the screen to the display location of an icon corresponding to an inbox folder which is determined according to predetermined sorting rules. For example, when an email having arrived this time is to be stored in the inbox folder A according to the predetermined sorting rules, as illustrated at Step SL5, the email icon IC4 moves to the folder icon IC5. Then, the email icon IC4 is stored in the folder icon IC5 and as illustrated at Step SL6, the number of emails stored in the inbox folder A is updated.

When the user wants to intentionally store the arrived email in the inbox folder B, as illustrated at Step SL7, the user drags the email icon IC4 to the folder icon IC6. When the mobile phone 4 detects that the email icon IC4 has been dragged to the folder icon IC6, the mobile phone 4 stores the arrived email in the inbox folder 3, ignoring the predetermined sorting rules. Then, as illustrated at Step SL8, the mobile phone 4 updates the number of emails stored in the inbox folder B.

When the user wants to forward the arrived email, as illustrated at Step SL9, the user drags the email icon IC4 to the forward icon IC7. When the mobile phone 4 detects that the email icon IC4 has been dragged to the forward icon IC7, as illustrated at Step SL10, the mobile phone 4 displays a screen for forwarding the arrived email, on the touch panel 32. The mobile phone 4 may store the arrived email in an inbox folder according to the predetermined sorting rules.

When the user determines that the arrived email is not necessary, as illustrated at Step SL11, the user performs a flick in a direction in which none of the icons are present, in a display area of the email icon IC4. When the mobile phone 4 detects the flick in the direction in which none of the icons are present, in the display area of the email icon IC4, the mobile phone 4 deletes the arrived email. As a result, as illustrated at Step SL12, the numbers of emails stored in the respective inbox folders are not updated. In this case, the mobile phone 4 may store the email in a trash folder instead of deleting the email.

It is to be noted that the aspects of the present invention explained in the above-described embodiments can be arbitrarily modified without departing from the spirit and scope of the present invention. The above-described embodiments may be appropriately combined. For example, a program such as the control program 24a explained in the above-described embodiment may be divided into a plurality of modules or may be integrated with another program. Although in the above-described embodiments operation on the touch panel 32 is performed with a finger, the operation may be performed with a stylus, a pen, or the like.

The advantages are that one embodiment of the invention provides an electronic device, an informing control method, and a storage medium storing therein a control program for informing information to a user while inhibiting anything that interferes with user activity.

What is claimed is:

1. An electronic device, comprising:
    a display unit configured to perform displaying of first information and displaying of second information to be displayed after the first information;
    an operating unit configured to accept an operation; and
    a control unit configured to cause the display unit to perform suppressing of the displaying of the second information when the operation is detected by the operating unit during a period of time from when the first information is displayed until the second information is displayed,
    wherein said suppressing comprises:
        cancelling the displaying of the second information when a duration of the detected operation is longer than a threshold value, and
        postponing the displaying of the second information when the duration of the detected operation is no longer than the threshold value.

2. The electronic device according to claim 1, wherein the display unit is configured to display the second information in a scrolling manner to perform the displaying of the second information.

3. The electronic device according to claim 2, wherein the operating unit is configured to accept a contact with a surface of the display unit as the operation.

4. The electronic device according to claim 3, wherein the operation is an operation to move a location of the contact with the surface of the display unit in a different direction than a scrolling direction of the second information.

5. The electronic device according to claim 3, wherein the operation is an operation to maintain the contact with the surface of the display unit, in a display area of the second information.

6. The electronic device according to claim 3, wherein the display unit is configured to further display an icon, and the second operation is an operation to move a location of the contact with the surface of the display unit to the icon.

7. The electronic device according to claim 2, wherein the operating unit is configured to accept a contact with a surface of the display unit as the operation, and
    the control unit is configured to cause the display unit to postpone the scrolling of the second information when the operation is performed for the operating unit during scrolling of the second information.

8. The electronic device according to claim 7, wherein the display unit is configured to perform the displaying of the second information while providing third information, and
    the control unit is configured to cause the display unit to perform the displaying of the second information again when the third information is switched to another after the displaying of the second information is postponed.

9. The electronic device according to claim 1, wherein the control unit is configured not to cause the display unit to perform the suppressing of the displaying of the second information when a degree of urgency of the second information is higher than a threshold value.

10. The electronic device according to claim 9, wherein the control unit is configured to cause the display unit to perform the suppressing of the displaying of the second information having the degree of urgency higher than the threshold value when a second operation is performed for the operating unit.

11. The electronic device according to claim 1, wherein the display unit is configured to display the first information that is associated with the second information.

12. The electronic device according to claim 11, wherein the display unit is configured to display the first information at a first location and to cause the first location of the first information to coincide with a second location where scrolling of the second information starts.

13. The electronic device according to claim 1, wherein a location where the second information is displayed is coincided with a location where the first information is displayed.

14. The electronic device according to claim 1, wherein the display unit is configured to display the second information when no operation is accepted by the operating unit during said period of time.

15. The electronic device according to claim 1, wherein the display unit is configured to display a screen provided by an application program behind the first information and the second information, and
    the control unit is configured to cause the display unit to perform the suppressing of the displaying of the second information when the operation is performed to the screen during said period of time.

16. The electronic device according to claim 1, wherein the display unit is configured to display the second information in a scrolling manner such that the second information appears from a first end of the display unit, flows towards a second end of the display unit, and disappears into the second end in an active manner.

17. A non-transitory storage medium comprising a control program configured to cause, when executed by an electronic device, the electronic device to execute:
    displaying first information;
    displaying second information after displaying the first information, the second information associated with the first information; and
    suppressing the displaying of the second information when an operation is detected during a period of time from when the first information is displayed until the second information is displayed, wherein said suppressing comprises:
cancelling the displaying of the second information when a duration of the detected operation is longer than a threshold value, and
postponing the displaying of the second information when the duration of the detected operation is no longer than the threshold value.

18. The non-transitory storage medium according to claim 17, wherein the control program is configured to cause the electronic device to execute such that the first information is displayed at a first location, and the first location coincides with a second location where scrolling of the second information starts.

19. A displaying control method performed by an electronic device, the displaying control method comprising:
displaying first information;
displaying second information after displaying the first information; and
suppressing the displaying of the second information when an operation is detected during a period of time from when the first information is displayed until the second information is displayed,
wherein said suppressing comprises:
cancelling the displaying of the second information when a duration of the detected operation is longer than a threshold value, and
postponing the displaying of the second information when the duration of the detected operation is no longer than the threshold value.

20. The displaying control method according to claim 19, wherein the first information is associated with the second information.

21. The displaying control method according to claim 20, wherein the first information is displayed at a first location, and the first location coincides with a second location where scrolling of the second information starts.

* * * * *